(12) United States Patent
Fujiwara et al.

(10) Patent No.: US 8,164,764 B2
(45) Date of Patent: Apr. 24, 2012

(54) IMAGE PROCESSING APPARATUS AND IMAGE PROCESSING SYSTEM

(75) Inventors: Katsuyoshi Fujiwara, Sennan-gun (JP); Yuji Okamoto, Souraku-gun (JP); Naofumi Ueda, Souraku-gun (JP); Syoichiro Yoshiura, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1546 days.

(21) Appl. No.: 11/233,606

(22) Filed: Sep. 22, 2005

(65) Prior Publication Data
US 2006/0061819 A1 Mar. 23, 2006

(30) Foreign Application Priority Data

Sep. 22, 2004 (JP) ................................ 2004-276208
Sep. 22, 2004 (JP) ................................ 2004-276234

(51) Int. Cl.
*G06F 3/12* (2006.01)
*G06K 15/00* (2006.01)

(52) U.S. Cl. ...................... 358/1.13; 358/1.15; 358/1.16

(58) Field of Classification Search ................... 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| 6,865,620 B2 * | 3/2005 | Homma | 710/19 |
| 6,947,182 B1 | 9/2005 | Kumagai | |
| 2003/0028753 A1 | 2/2003 | Ohishi | |
| 2005/0111866 A1 * | 5/2005 | Sato | 399/79 |

FOREIGN PATENT DOCUMENTS

| JP | 01-256068 | 10/1989 |
| JP | 06-178041 | 6/1994 |
| JP | 07-028365 | 1/1995 |
| JP | 09-223061 | 8/1997 |
| JP | 2005-057490 | 3/2005 |

* cited by examiner

*Primary Examiner* — Thierry Pham
(74) *Attorney, Agent, or Firm* — David G. Conlin; Steven M. Jensen; Edwards Wildman Palmer LLP

(57) ABSTRACT

When an instruction to execute an image processing from a user is accepted through an operation panel, a control section temporarily stores image data read from an original or externally received image data in an HDD, and then, outputs processing information related to the image processing based on the accepted execution instruction and the image data stored in the HDD from a communication section to a server apparatus as historical data. When an obtaining completion signal representative of the completion of obtaining of the historical data is obtained from the server apparatus through the communication section, the control section performs the image processing on the image data stored in the HDD according to the accepted execution instruction. Then, the control section erases the image data subjected to the processing from the HDD.

15 Claims, 20 Drawing Sheets

FIG. 3A

**ADMINISTRATOR
AUTHENTICATION SCREEN**

INPUT AUTHENTICATION DATA 1 1 1 1

AUTHENTICATE  END

FIG. 3B

**ADMINISTRATOR
OPERATION SCREEN**

SELECT OPERATION

START HISTORICAL DATA
MANAGEMENT PROCESSING

END HISTORICAL DATA
MANAGEMENT PROCESSING

END

FIG. 3C

**MANAGEMENT CONDITION
SETTING SCREEN**

SELECT KIND OF PROCESSING FOR WHICH
HISTORICAL DATA IS TO BE MANAGED

COPY    PRINTER

FAX

SET   END

F I G. 4A
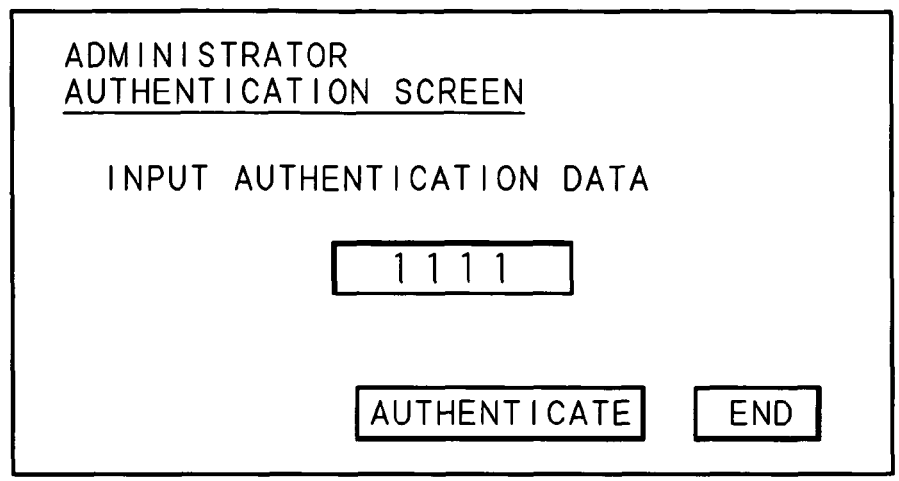
F I G. 4B
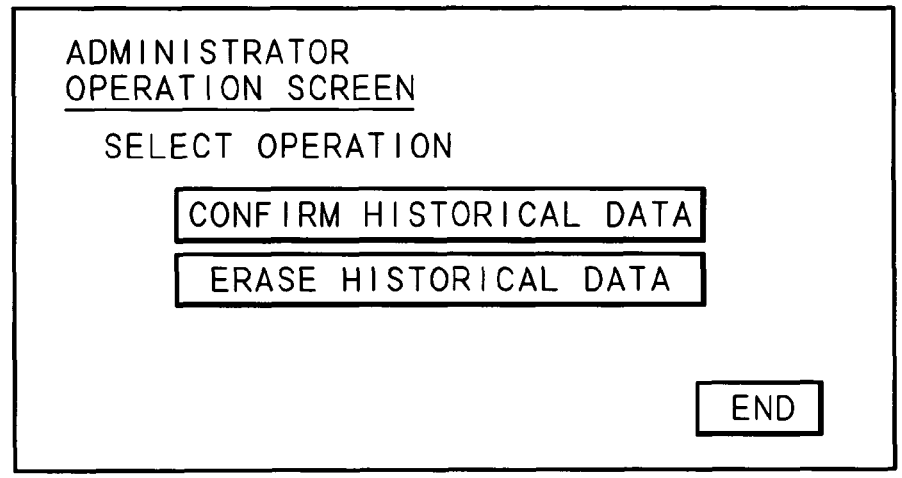

FIG. 5C

PROCESSING INFORMATION LIST

| DATE/TIME | PROCESSING | CONTENTS |
|---|---|---|
| 2004/8/1/10:00 | FAX TRANSMISSION | 2SHEETS, FAX3 |
| 2004/8/1/11:00 | FAX TRANSMISSION | 3SHEETS, FAX3 |
| 2004/8/1/11:10 | FAX RECEPTION | 2SHEETS, FAX5 |
| 2004/8/1/11:30 | FAX TRANSMISSION | 10SHEETS, FAX5 |
| 2004/8/1/12:00 | FAX RECEPTION | 5SHEETS, FAX3 |

[ OK ]  [ END ]

FIG. 5D

2004/8/1/11:00   FAX TRANSMISSION   3SHEETS, FAX3

[ PRINT ]  [ END ]

FAX TRANSMISSION SHEET

AAA Co., Ltd          Mr. XXXXX

FIG. 11A

ADMINISTRATOR
AUTHENTICATION SCREEN

INPUT AUTHENTICATION DATA 1 1 1 1

AUTHENTICATE   END

FIG. 11B

ADMINISTRATOR
OPERATION SCREEN

SELECT OPERATION

START HISTORICAL DATA
MANAGEMENT PROCESSING

END HISTORICAL DATA
MANAGEMENT PROCESSING

CONFIRM HISTORICAL DATA

ERASE HISTORICAL DATA   END

FIG. 11C

MANAGEMENT CONDITION
SETTING SCREEN

・SELECT MANAGEMENT PLACE OF
 HISTORICAL DATA

IN THIS MACHINE   SERVER   BOTH

・SELECT PROCESSING FOR MANAGEMENT

COPY   FAX   PRINTER

SET   END

FIG. 13A

PROCESSING INFORMATION LIST

| DATE/TIME | PROCESSING | CONTENTS |
|---|---|---|
| 2004/8/1/10:00 | FAX TRANSMISSION | 2SHEETS,FAX3 |
| 2004/8/1/11:00 | FAX TRANSMISSION | 3SHEETS,FAX3 |
| 2004/8/1/11:10 | FAX RECEPTION | 2SHEETS,FAX5 |
| 2004/8/1/11:30 | FAX TRANSMISSION | 10SHEETS,FAX5 |
| 2004/8/1/12:00 | FAX RECEPTION | 5SHEETS,FAX3 |

[OK] [END]

FIG. 13B

2004/8/1/11:00  FAX TRANSMISSION  3SHEETS,FAX3

[PRINT] [END]

FAX TRANSMISSION SHEET

AAA Co., Ltd

Mr. XXXXX

FIG. 14A

HISTORICAL DATA ERASURE SCREEN

SELECT MANAGEMENT PLACE OF
HISTORICAL DATA TO BE ERASED

| IN THIS MACHINE | SERVER |

END

FIG. 14B

HISTORICAL DATA ERASURE SCREEN

SELECT ERASURE METHOD
FOR HISTORICAL DATA

ERASE ALL HISTORICAL DATA

ERASE ACCORDING TO KIND OF PROCESSING

ERASE ACCORDING TO DATE AND TIME

END

F I G. 1 8
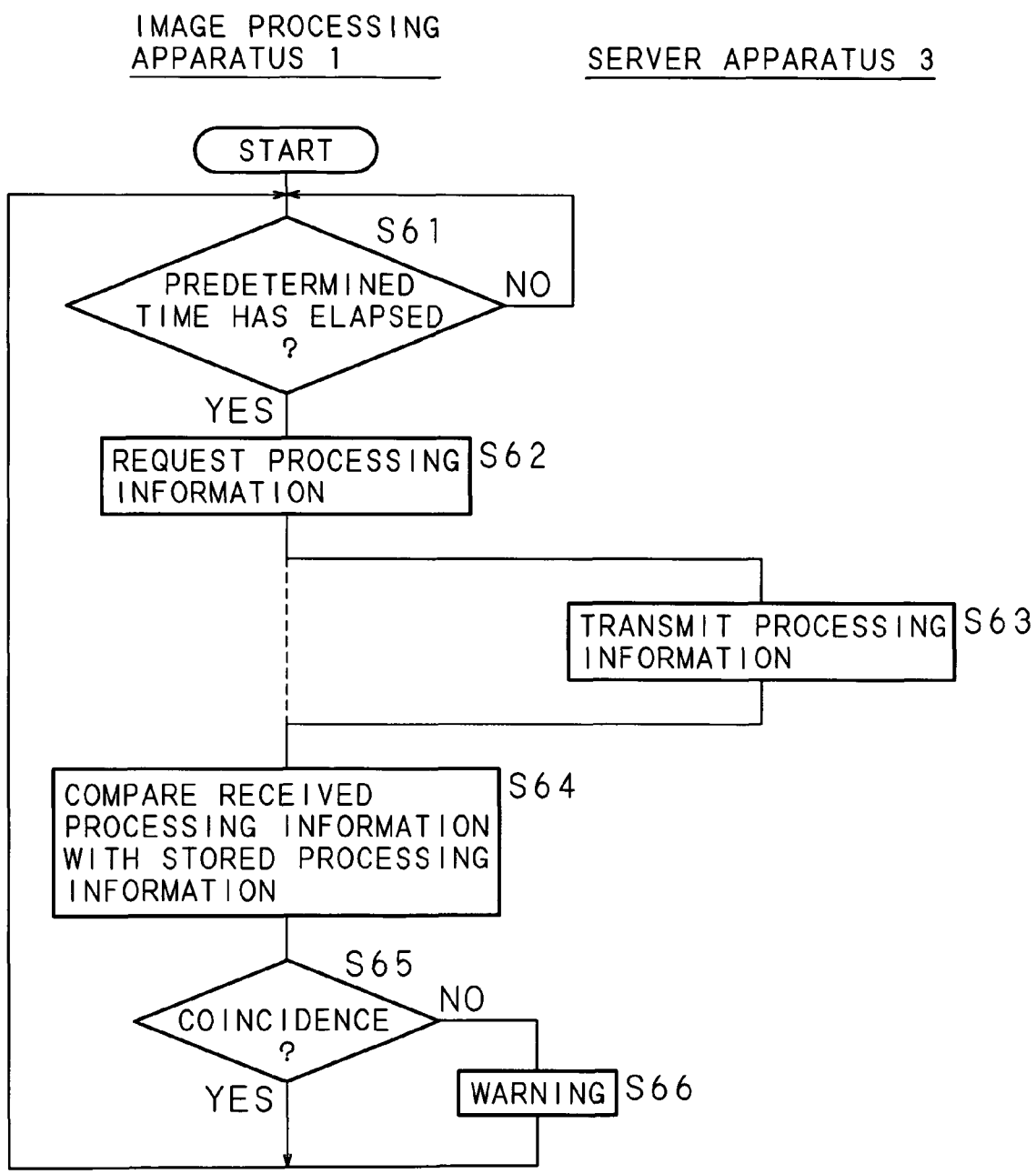

IMAGE PROCESSING APPARATUS AND IMAGE PROCESSING SYSTEM

CROSS-REFERENCE TO RELATED APPLICATIONS

This Nonprovisional application claims priority under 35 U.S.C. §119(a) on Patent Applications Nos. 2004-276208 and 2004-276234 filed in Japan on Sep. 22, 2004, the entire contents of which are hereby incorporated by reference.

BACKGROUND OF THE INVENTION

The present invention relates to an image processing apparatus that outputs, to an external apparatus, data subjected to the image processing and the information related to the image processing performed on the data together as historical information, and to an image processing system in which the image processing apparatus and the external apparatus storing the historical information are connected together.

Conventionally, as an image processing apparatus, a digital multi-function apparatus has been commercialized that is provided with a plurality of functions such as: a copier function to capture an image recorded on an original as image data by scanning it, form an image based on the captured image data on a sheet and output it; a facsimile function to transmit and receive image data to and from an external facsimile apparatus by facsimile communication; a transmission function to transmit the captured image data to an external apparatus; and a printer function to receive image data transmitted from an external apparatus and output it onto a sheet. In particular, digital multi-function apparatuses in recent years are provided with storing means such as a hard disc for storing image data, and are structured so as to be capable of performing the processings of the functions in parallel.

As a new function of the digital multi-function apparatus as described above, a function has been realized that enables the digital multi-function apparatus to be used as a server apparatus for image data by storing data such as captured image data and data obtained from an external apparatus in the storing means and enabling the stored data to be outputted as an image recorded on a sheet as required or to be transmitted to an externally connected apparatus such as a personal computer.

As an example of such a function, Japanese Patent Application Laid-Open No. 6-178041 (1994) discloses an image data output control apparatus provided with an electronic filing function to store the image data captured by use of a scanner or the image data received by facsimile communication and provide an instruction to read out the image data and output an image as required. By using such an image processing apparatus, the image data having been used once can be reused, so that the user can output a document or an image without a hitch when necessary.

On the other hand, image data handled by the image processing apparatus includes confidential image data such as documents containing trade secrets. When unlimited storage and output of image data are permitted in the image processing apparatus, security problems arise such as leakage of information and unauthorized use of information. Therefore, Japanese Patent Application Laid-Open No. 7-28365 (1995) discloses a copying apparatus that performs personal authentication before use and permits only pre-registered users to use the copying apparatus.

Further, as a security measure for the image data stored in the image processing apparatus, Japanese Patent Application Laid-Open No. 1-256068 (1989) discloses a technology to encrypt image data when storing it in the storing means.

Moreover, Japanese Patent Application Laid-Open No. 9-223061 (1997) discloses a technology to erase the stored image data from the storing means when it becomes unnecessary. Thus, by the image processing apparatus encrypting the image data, it is difficult to unauthorizedly use the image data fetched from the image processing apparatus, and by the image processing apparatus erasing the image data, it is impossible to fetch the image data from the image processing apparatus, so that the security of the image processing apparatus is improved.

However, in the electronic filing function to store the image data in the storing means as described above, although the security of the image processing apparatus can be improved by performing the processing to encrypt the image data when storing it or the processing to erase the unnecessary image data, how each piece of stored image data was used in the past cannot be grasped, and consequently, even if each piece of image data has been unauthorizedly used, it cannot be grasped.

BRIEF SUMMARY OF THE INVENTION

The present invention is made in view of such circumstances, and an object thereof is to provide an image processing apparatus in which by outputting the data accepted for performing an image processing to a predetermined external apparatus together with the information related to the image processing as historical information, the historical information of each piece of data can be managed by the external apparatus.

Another object of the present invention is to provide an image processing system in which the above-described image processing apparatus and the external apparatus that manages the historical information outputted from the image processing apparatus are provided so as to communicate with each other and by restricting the access to the historical information outputted from the image processing apparatus and stored in the external apparatus, unauthorized use and unauthorized editing of the historical information of each piece of data can be prevented.

Yet another object of the present invention is to provide an image processing system in which the data accepted for performing an image processing is stored in an image processing apparatus and/or an external apparatus together with the processing information related to the image processing as historical information and the historical information of each piece of data can be managed by the image processing apparatus and/or the external apparatus.

Still another object of the present invention is to provide an image processing system in which by comparing the historical information stored in the image processing apparatus as described above with the historical information stored in the external apparatus, unauthorized editing or unauthorized erasure of the historical information stored in each apparatus can be detected.

In an image processing apparatus according to the present invention provided with: a data storing unit that stores accepted data; an instruction accepting unit that accepts an instruction to execute an image processing based on the accepted data; and a processing unit that performs the image processing based on the data stored in the data storing unit according to the execution instruction accepted by the instruction accepting unit, the following are provided: an output unit that outputs the data stored in the data storing unit and information related to the image processing based on the data the execution instruction of which is accepted by the instruction accepting unit, to a predetermined external apparatus, as historical information; an obtaining unit that obtains a signal representative of completion of obtaining of the historical information from the external apparatus; and an erasing unit that erases the data related to the historical information from the data storing unit when the obtaining unit obtains the signal.

According to the present invention, in the image processing apparatus that stores the accepted data in the data storing unit and performs the image processing based on the data stored in the data storing unit according to the accepted execution instruction when an instruction to execute the image processing based on the data is accepted, the data and the information related to the image processing based on the data is transmitted to the predetermined external apparatus as historical data. By outputting the data accepted and stored in the data storing unit and the information related to the image processing based on the data the execution instruction of which is accepted to the predetermined external apparatus as historical data, each piece of data, together with various processing conditions in the image processing based on the data and information such as the date and time of execution of the image processing, can be managed in the external apparatus as historical information. Consequently, with respect to the image processing performed on each piece of data, the number of sheets where the image is formed, the number of copies, the formation density, the reduction ratio or the enlargement ratio, the date and time of execution and the like can be managed together with the data subjected to the processing, so that these pieces of information can be confirmed at a later date. Moreover, when each piece of data is unauthorizedly used, since the use condition of each piece of data can be tracked based on these pieces of information, security can be improved. Moreover, when the signal representative of the completion of obtaining of the historical signal is obtained from the external apparatus to which the historical information is outputted, the data related to the historical information is erased from the data storing unit. Consequently, each piece of data, together with the information related to the image processing based on the data, can be managed in the external apparatus as historical data. Moreover, by erasing the data related to the historical information only when the data is surely obtained by the external apparatus, the historical information can be surely obtained and the data storing unit can be effectively used.

In an image forming apparatus according to the present invention, the processing unit starts the image processing related to the historical information when the obtaining unit obtains the signal, and the erasing unit erases the data related to the historical information when the processing unit ends the image processing.

According to the present invention, by starting the image processing related to the historical information when the signal representative of the completion of obtaining of the historical information is obtained from the external apparatus, the historical information can be surely stored in the external apparatus before the image processing is started. Moreover, by erasing the data made unnecessary by the end of the image processing, the data storing unit can be effectively used and data leakage can be prevented.

An image processing apparatus according to the present invention is provided with an authenticating unit, the processing unit performs the image processing based on the data stored in the data storing unit according to the execution instruction accepted by the instruction accepting unit when the authenticating unit authenticates as authorized, and the historical information includes information related to authentication performed when the processing unit performs the image processing based on the data.

According to the present invention, in the image processing apparatus that performs authentication and performs the image processing according to the accepted execution instruction only when a user is authenticated as authorized, the information related to the authentication necessary when the image processing is performed is transmitted to the external apparatus in a condition of being included in the historical information, whereby for example, when the user information can be obtained from the information related to authentication, the information on the user providing the instruction to execute the image processing, together with each piece of data, can be managed in the external apparatus. Consequently, not only the image processing performed on each piece of data but also the user providing the instruction to execute the image processing can be grasped. Moreover, for example, when data is used by hacking with no authentication performed, this can be detected.

An image processing apparatus according to the present invention is provided with: a plurality of the processing units that perform a plurality of kinds of image processings, respectively; a unit that accepts an instruction as to whether to output the historical information to the external apparatus or not for each image processing performed by each of the processing units; and a setting unit that sets whether to output the historical information related to each image processing to the external apparatus or not according to the accepted instruction, and the output unit outputs, to the external apparatus, the historical information related to the image processing that is set so as to be outputted by the setting unit.

According to the present invention, with respect to each of the plurality of kinds of image processings, the instruction as to whether to output the historical information to the external apparatus or not is accepted, whether to output the historical information related to each image processing to the external apparatus or not is set according to the accepted instruction, and only the historical information related to the image processing that is set so as to be outputted is outputted to the external apparatus. Consequently, the kind of image processing whose historical information is managed in the external apparatus can be set by an instruction from the user. Moreover, the kind of image processing whose historical information is stored in the external apparatus can be arbitrarily changed by the user.

An image processing apparatus according to the present invention is provided with a unit that determines whether or not predetermined information is included in the data stored in the data storing unit, and the output unit outputs, to the external apparatus, the historical information related to the data determined to include the predetermined information.

According to the present invention, whether or not the predetermined information is included in the data accepted and stored in the data storing unit is determined, and the historical information related to the data including the predetermined information is outputted to the external apparatus. For example, by managing, in the external apparatus, only the historical information related to the data including the predetermined information like the image data read from the original with a mark representing that this is a confidential document, whether to output the historical information to the external apparatus or not can be set based on each piece of data stored in the data storing unit, and it can be performed to select an important document preferably managed as historical information and store the historical information.

An image processing apparatus according to the present invention is provided with a unit that interrupts storage of the accepted data into the data storing unit, and the output unit outputs, to the external apparatus, the historical information related to the data stored in the data storing unit before the data storage into the data storing unit is interrupted.

According to the present invention, when the processing to store the accepted data into the data storing unit is interrupted, the historical information related to the data stored in the data storing unit before the interruption is outputted to the external apparatus. Even when the image processing based on the accepted data is not executed, the data obtained up to the middle of the image processing can be managed in the external apparatus as historical information, and the historical information related to all the data on which the image processing is to be executed can be managed in the external apparatus.

An image processing apparatus according to the present invention is provided with: a stop authenticating unit that performs authentication in order to stop the processing to output the historical information to the external apparatus; and a unit that stops the processing to output the historical information when the stop authenticating unit authenticates as authorized.

According to the present invention, authentication is performed when the processing to output the historical information to the external apparatus is stopped, and by permitting only authorized persons to stop the processing to output the historical information, unauthorized persons are inhibited from stopping the processing to output the historical information to the external apparatus, so that inadvertent reduction in security can be prevented.

In an image processing apparatus according to the present invention provided with: a data storing unit that stores accepted data; an instruction accepting unit that accepts an instruction to execute an image processing based on the accepted data; a processing unit that performs the image processing based on the data stored in the data storing unit according to the execution instruction accepted by the instruction accepting unit, the following are provided: a history storing unit that stores the data stored in the data storing unit and information related to the image processing based on the data the execution instruction of which is accepted by the instruction accepting unit, as historical information; an output unit that outputs the historical information stored in the history storing unit to a predetermined external apparatus; an obtaining unit that obtains a signal representative of completion of obtaining of the historical information from the external apparatus; and an erasing unit that erases the historical information from the history storing unit when the obtaining unit obtains the signal.

According to the present invention, in the image processing apparatus that stores the accepted data in the data storing unit and performs the image processing based on the data stored in the data storing unit according to the accepted execution instruction when an instruction to execute the image processing based on the data is accepted, the data and the information related to the image processing based on the data is stored in the history storing unit as historical data. Moreover, when the historical information stored in the history storing unit is outputted to the predetermined external apparatus and the signal representative of the completion of obtaining of the history information is obtained from the external apparatus, the historical information is erased from the history storing unit. Consequently, each piece of data, together with the information related to the image processing based on the data, can be managed by the history storing unit as historical information, and it can be performed to output the historical information stored in the history storing unit to the external apparatus and manage it also in the external apparatus. Moreover, by erasing the historical information stored in the history storing unit when it is surely obtained by the external apparatus, unnecessary historical information is not stored in the image processing apparatus, so that the history storing unit can be effectively used.

An image processing apparatus according to the present invention is provided with: a key storing unit that stores an encryption key; and a unit that encrypts the historical information by use of the encryption key stored in the key storing unit, the output unit outputs encrypted historical information to the external apparatus, and the following are further provided: a unit that obtains the encrypted historical information from the external apparatus; and a unit that decrypts the obtained historical information by use of the encryption key stored in the key storing unit.

According to the present invention, by encrypting the historical information when it is outputted to the external apparatus, even when the historical information managed in the external apparatus leaks, unauthorized use of the historical information can be prevented. Moreover, by obtaining the encrypted historical information from the external apparatus and decrypting it, the historical information managed in the external apparatus can be confirmed.

An image processing system according to the present invention is provided with: the image processing apparatus according to one of the above-described structures; and an external apparatus capable of communicating with the image processing apparatus, the external apparatus is provided with: an external history storing unit that stores historical information outputted from the image processing apparatus; a unit that outputs a signal representative of completion of obtaining of the historical information to the image processing apparatus when the historical information is stored in the external history storing unit; an access authenticating unit that performs authentication in order to access the external history storing unit; and a unit that permits the access when the access authenticating unit authenticates as authorized.

According to the present invention, the external apparatus capable of communicating with the above-described image processing apparatus stores the historical information outputted from the image processing apparatus in the external history storing unit, and when the history information is stored in the external history storing unit, the signal representative of the completion of obtaining of the historical information is outputted to the image processing apparatus. Consequently, in the image processing apparatus obtaining the signal, it can be detected that the outputted historical information is obtained by the external apparatus, the image processing corresponding to the outputted historical information can be started, and when the image processing is finished, the data corresponding to the historical information can be erased. Moreover, by performing authentication when accessing the external history storing unit storing the historical information and permitting the access when the user is authenticated as authorized, unauthorized persons are inhibited from handling the history information, so that unauthorized editing and erasure of the historical information can be prevented.

In an image processing system according to the present invention comprising: an image processing apparatus provided with a data storing unit that stores accepted data, an instruction accepting unit that accepts an instruction to execute an image processing based on the accepted data, and a processing unit that performs the image processing based on the data stored in the data storing unit according to the execution instruction accepted by the instruction accepting unit; and an external apparatus capable of communicating with the image processing apparatus, the image processing apparatus is provided with: a history storing unit that stores the data stored in the data storing unit and processing information related to the image processing based on the data the execution instruction of which is accepted by the instruction accepting unit, as historical information; and an output unit that outputs the historical information to the external apparatus, the external apparatus is provided with an external history storing unit that stores the historical information outputted from the image processing apparatus, and the image processing apparatus is provided with a control unit that performs at least one of a processing to store the historical information into the history storing unit and a processing to output the historical information to the external apparatus.

According to the present invention, in the image processing apparatus that performs, when the accepted data is stored in the data storing unit and the instruction to execute the image processing based on the data is accepted, the image processing based on the data stored in the data storing unit according to the accepted execution instruction, at least one of the following processings is performed: the processing to store the data and the processing information related to the image processing based on the data into the history storing unit as historical information; and the processing to output the historical information to the external apparatus capable of communication. When the image processing apparatus outputs the history information to the external apparatus, the external apparatus stores the historical information in the external history storing unit. Consequently, each piece of data, together with various processing conditions in the image processing based on the data and processing information such as the date and time of execution of the image processing, can be managed in the image processing apparatus and/or the external apparatus as historical data. Consequently, with respect to the image processing performed on each piece of data, for example, the number of sheets where the image is formed, the number of copies, the formation density, the reduction ratio or the enlargement ratio, the date and time of execution and the like can be managed together with the data subjected to the processing, so that these pieces of information can be confirmed at a later date. Moreover, when each piece of data is unauthorizedly used, since the use condition of each piece of data can be tracked based on these pieces of information, security can be improved.

In an image processing system according to the present invention, the image processing apparatus is provided with: a unit that accepts an instruction to perform one or both of the processing to store the historical information into the history storing unit and the processing to output the historical information to the external apparatus; and a setting unit that makes a setting so that one or both of the storage processing and the output processing are performed according to the accepted instruction, and the control unit performs the processing that is set so as to be performed by the setting unit.

According to the present invention, the instruction to perform one or both of the processing to store the historical information into the history storing unit and the processing to output the historical information to the external apparatus is accepted, a setting is made so that one or both of the storage processing and the output processing are performed according to the accepted instruction, and the processing that is set so as to be performed is executed. Consequently, whether to manage the historical information in the image processing apparatus, manage the historical information in the external apparatus or manage the historical information in both can be set according to an instruction from the user. The management place of the historical information can be arbitrarily changed by the user.

In an image processing system according to the present invention, the image processing apparatus is provided with: a plurality of the processing units that perform a plurality of kinds of image processings, respectively; and a unit that accepts an instruction to perform one or both of a processing to store the historical information into the history storing unit and a processing to output the historical information to the external apparatus for each image processing performed by each of the processing units, and the setting unit makes a setting so that one or both of the storage processing and the output processing are performed for each image processing according to the accepted instruction.

According to the present invention, with respect to each of the plurality of kinds of image processings, the instruction to perform one or both of the processing to store the historical information into the history storing unit and the processing to output the historical information to the external apparatus is accepted, a setting is made so that one or both of the storage processing and the output processing are performed for each image processing according to the accepted instruction, and the processing that is set so as to be performed is executed. Consequently, the kind of image processing whose historical information is managed in the image processing apparatus and the kind of image processing whose historical information is managed in the external apparatus can be set by an instruction from the user. The kind of image processing whose historical information is stored in the image processing apparatus and/or the external apparatus can be arbitrarily changed by the user.

In an image processing system according to the present invention, at least one of the image processing apparatus and the external apparatus is provided with a comparing unit that compares at least processing information included in each piece of historical information stored in the history storing unit and having been transmitted to the external apparatus with at least processing information included in each piece of historical information stored in the external history storing unit when the control unit of the image processing apparatus performs both of the processing to store the historical information into the history storing unit and the processing to output the historical information to the external apparatus, and when the comparing unit determines that the pieces of processing information coincide with each other, the output unit of the image processing apparatus outputs, to the external apparatus, the historical information stored in the history storing unit and not having been transmitted to the external apparatus.

According to the present invention, when the historical information is managed in both of the image processing apparatus and the external apparatus, at least the processing information included in the historical information, having been transmitted to the external apparatus, of the historical information stored in the image processing apparatus is compared with at least the processing information included in the historical information stored in the external apparatus. Consequently, whether or not the historical information stored in the external apparatus or the historical information having already been transmitted to the external apparatus by the image processing apparatus is unauthorizedly edited or erased can be detected based on the processing information in each piece of historical information. Moreover, when these pieces of processing information coincide with each other, the image processing apparatus outputs, to the external apparatus, the historical information, not having been transmitted to the external apparatus, of the historical information stored in the history storing unit. Consequently, when these pieces of processing information coincide with each other, it can be performed to transmit the historical information not yet having been transmitted to the external apparatus, to the external apparatus and it is possible to manage it in the external apparatus. Further, when the data, included in the historical information stored in the image processing apparatus, itself is compared with the data, included in the historical information stored in the external apparatus, itself, data falsification in the historical information stored in each of the image processing apparatus and the external apparatus can also be detected.

In an image processing system according to the present invention, at least one of the image processing apparatus and the external apparatus is provided with: a comparing unit that compares at least processing information included in each piece of historical information stored in the history storing unit and having been transmitted to the external apparatus with at least processing information included in each piece of historical information stored in the external history storing unit when the control unit of the image processing apparatus performs both of the processing to store the historical information into the history storing unit and the processing to output the historical information to the external apparatus; and a unit that notifies a result of the comparison by the comparing unit to outside.

According to the present invention, when the historical information is managed in both of the image processing apparatus and the external apparatus, at least the processing information included in the historical information, having been transmitted to the external apparatus, of the historical information stored in the image processing apparatus is compared with at least the processing information included in the historical information stored in the external apparatus, and the result of the comparison is notified. Consequently, whether or not the historical information stored in the external apparatus or the historical information having already been transmitted to the external apparatus by the image processing apparatus is unauthorizedly edited or erased can be detected based on the processing information in each piece of historical information, and when the historical information managed in each of the image processing apparatus and the external apparatus is unauthorizedly edited or erased, this can be notified.

In an image processing system according to the present invention, the image processing apparatus is provided with: a key storing unit that stores an encryption key; and a unit that encrypts at least data included in each piece of historical information by use of the encryption key stored in the key storing unit, the output unit outputs encrypted historical information to the external apparatus, and the image processing apparatus is provided with: a unit that obtains the encrypted historical information from the external apparatus in response to a request to the external apparatus; and a unit that decrypts the obtained historical information by use of the encryption key stored in the key storing unit.

According to the present invention, by encrypting at least the data included in the historical information when the historical information is outputted to the external apparatus, even when the historical information managed in the external apparatus leaks, unauthorized use of the data included in the historical information can be prevented. Moreover, by obtaining the encrypted historical information from the external apparatus and decrypting it, the historical information managed in the external apparatus can be confirmed by the image processing apparatus.

The above and further objects and features of the invention will more fully be apparent from the following detailed description with accompanying drawings.

BRIEF DESCRIPTION OF THE SEVERAL VIEWS OF THE DRAWINGS

FIG. 3A is a schematic view showing an example of the arrangement of an administrator authentication screen;

FIG. 3B is a schematic view showing an example of the arrangement of an administrator operation screen;

FIG. 3C is a schematic view showing an example of the arrangement of a management condition setting screen;

FIG. 4A is a schematic view showing an example of the arrangement of an administrator authentication screen;

FIG. 4B is a schematic view showing an example of the arrangement of an administrator operation screen;

FIGS. 5A to 5D are schematic views showing an example of the arrangement of a historical data display screen;

FIG. 11A is a schematic view showing an example of the structure of an administrator authentication screen;

FIG. 11B is a schematic view showing an example of the arrangement of an administrator operation screen;

FIG. 11C is a schematic view showing an example of the arrangement of a management condition setting screen;

FIGS. 13A and 13B are schematic views showing an example of the arrangement of the historical data display screen;

FIGS. 14A and 14B are schematic views showing an example of the arrangement of a historical data erasure screen;

FIG. 18 is a flowchart showing the procedure of a historical data comparison processing.

DETAILED DESCRIPTION OF THE INVENTION

An image processing system according to the present invention will be concretely described with reference to the drawings showing embodiments thereof. The image processing system according to the embodiments shown below has a structure such that an image processing apparatus which is a multi-function apparatus having multiple functions such as a copier function, a facsimile communication function and a network communication function and a server apparatus as a predetermined external apparatus are connected together through a communication network such as a LAN (local area network).

(First Embodiment)

Figure 1:
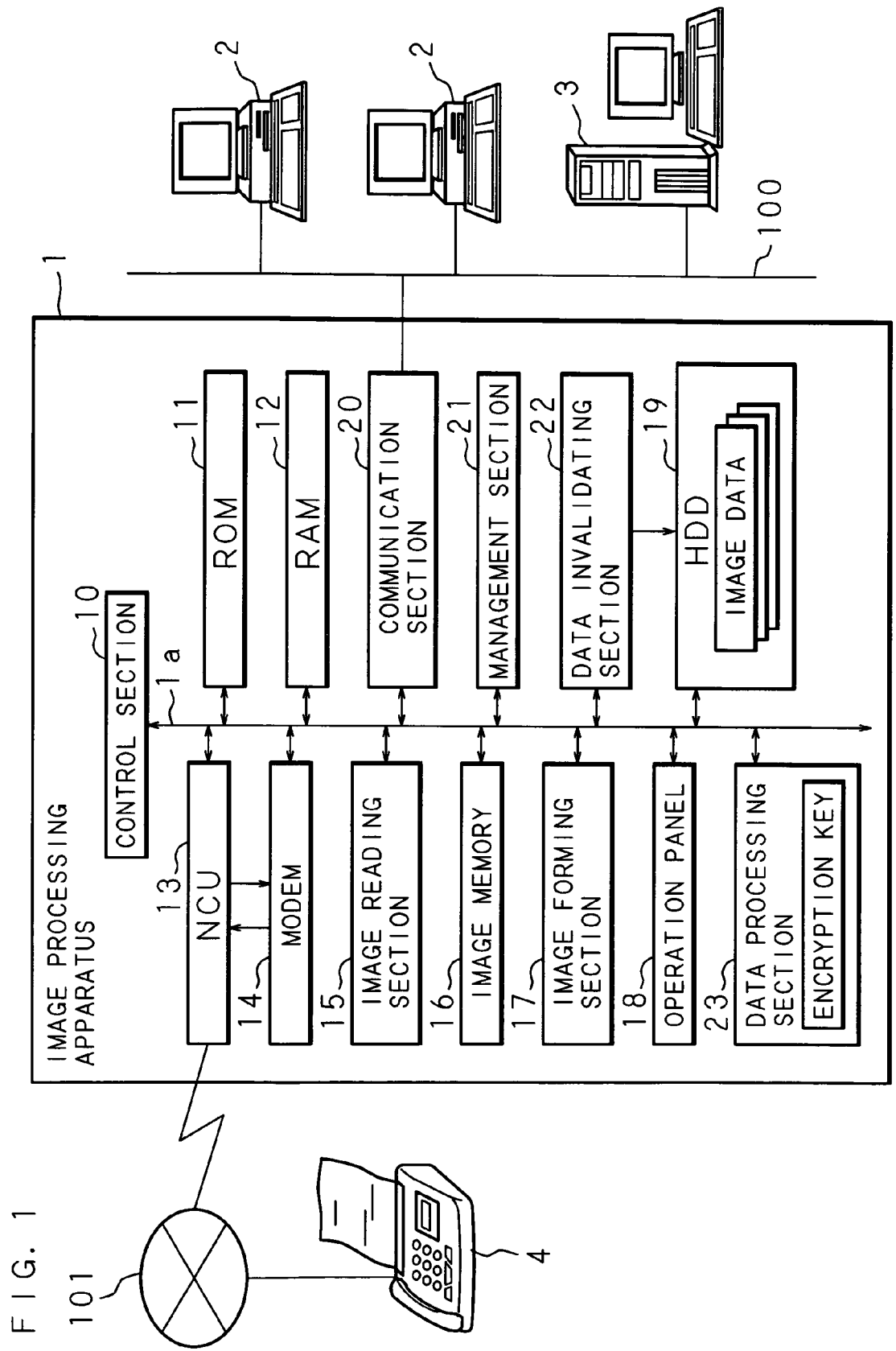
FIG. 1 is a block diagram showing an example of the internal structure of an image processing apparatus according to a first embodiment.

FIG. 1 is a block diagram showing an example of the internal structure of an image processing apparatus according to a first embodiment. An image processing apparatus 1 is provided with a control section 10, a ROM 11, a RAM 12, an NCU (network control unit) 13, a modem 14, an image reading section 15, an image memory 16, an image forming section 17, an operation panel 18, a hard disc device (hereinafter, referred to as HDD) 19, a communication section 20, a management section 21, a data invalidating section 22 and a data processing section 23. These components are interconnected through a bus 1a.

The control section 10, which comprises a CPU (central processing unit) or an MPU (micro processor unit) having a timer (not shown), controls each hardware section as described above connected through the bus 1a and reads out a control program prestored in the ROM 11 into the RAM 12 as appropriate for execution. The ROM 11 prestores programs such as various control programs and an authentication program necessary for causing the image processing apparatus 1 to operate as the image processing apparatus according to the present invention. The RAM 12 comprises an SRAM or a flash memory, and temporarily stores the data generated when a control program is executed by the control section 10.

The modem 14 comprises a fax modem capable of facsimile communication, and is connected to the NCU 13 also directly. The NCU 13 is connected to a public telephone line network 101, and operates as processing means for connecting the modem 14 to the public telephone line network 101 as required and performing the facsimile communication processing with an external facsimile apparatus 4 through the public telephone line network 101.

The communication section 20, which is an interface for connection to a communication network 100, receives print jobs from a server apparatus 3 and computers 2 connected to the communication network 100, and transmits information to be notified to the server apparatus 3 and to the computers 2. The communication section 20 operates as processing means for transmitting, for example, the image data read from the original by the image reading section 15 to the external computers 2.

The operation panel 18 is provided with an operation section that accepts operation instructions from the user and a display section that displays information to be notified to the user. The operation section which has various operation buttons for accepting operation instructions from the user is instruction accepting means for accepting instructions from the user such as an instruction to execute an operation to switch the set value in each function such as the number of prints or the copy density or an operation to switch the function and an instruction to execute each processing. The display section is provided with a liquid crystal display, and displays the operation status of the image processing apparatus 1, various set values inputted through the operation section and information to be notified to the user.

The image reading section 15 is a scanner provided with a light source that applies light to the original to be read, an image sensor using a CCD (charge coupled device) or the like and an A/D converter. In the image reading section 15, the image sensor forms an image of the original placed in a predetermined reading position, the image is converted into an analog electric signal, and the obtained analog electric signal is A/D converted by the A/D converter. Then, in the image reading section 15, digital image data is generated by performing, on the digital signal obtained by the A/D conversion, corrections of the light distribution characteristic of the light source, the sensitivity nonuniformity of the image sensor and the like, when the original is read and the generated digital image data is stored in the image memory 16.

The image memory 16 comprises, for example, a DRAM, and temporarily stores the image data generated by the image reading section 15 reading the image of the original, the image data received from the external facsimile apparatus 4 through the public telephone line network 101 and the image data obtained by developing a print job received from the external computers 2 through the communication network 100. The image data stored in the image memory 16 is transferred page by page to the data processing section 23 when an encryption processing is necessary and to the HDD 19 when no encryption processing is necessary.

The image forming section 17 is provided with, for example, a charging unit that charges a photosensitive drum to a predetermined electric potential, a laser writing unit that generates an electrostatic latent image on the photosensitive drum by emitting laser light according to the image data, a developing unit that forms a toner image by supplying toner to the electrostatic latent image formed on the surface of the photosensitive drum, and a transferring unit that transfers the toner image formed on the surface of the photosensitive drum onto a sheet, an OHP film and the like (these units are not shown). The image forming section 17 operates as processing means for forming an image desired by the user on a sheet by the electrophotographic method. It is to be noted that the image forming section 17 is not limited to the one that performs image formation by the electrophotographic method using the laser writing unit but may be one that performs image formation by the ink-jet method, the thermal transfer method or the dye-sublimation method.

The management section 21 comprises, for example, a flash memory, and stores the information related to the hardware constituting the image processing apparatus 1 and the information related to the internal status of the apparatus. The management section 21 is structured so as to obtain these pieces of information by communicating with each hardware section when the power is turned on and update, whenever necessary, the contents of the information being managed, by periodically monitoring the status of the hardware in operation.

Moreover, the management section 21 stores the authentication information used for the authentication processing performed as appropriate while the image processing apparatus 1 is operating. As the authentication information, for example, an authentication number comprising a plurality of digits of numerals is prestored in the management section 21. The control section 10 operates as authenticating means for, when the authentication data is inputted from the operation panel 18, reading out the authentication program stored in the ROM 11 into the RAM 12 and executing it to thereby determine whether or not the inputted authentication data coincides with the management information prestored in the management section 21 and when it coincides, authenticating the user as an authorized user or administrator.

The HDD 19 is a large-capacity storage device, and serves as data storing means for storing the image data read from the original by the image reading section 15, the image data received from the external facsimile apparatus 4 and the image data obtained by developing a print job received from the external computers 2. The image data stored in the HDD 19 can be read out for reuse as required when an image that has been outputted once is required to be outputted again for a reason such as failure of output or shortage of the number of output copies, or according to an instruction from the user or an instruction transmitted from the computers 2 and received by the communication section 20.

By thus storing the image data in the HDD 19, the image processing apparatus 1 functions as a file server apparatus for the image data. While the convenience by the reuse of the image data can be improved when the image data is stored in the HDD 19, when the image data is not stored in the HDD 19, since leakage of image data from the image processing apparatus 1 can be prevented, security can be improved.

Therefore, it is necessary for the user and the administrator of the image processing apparatus 1 only to set whether to store the image data in the HDD 19 or not according to the order of priority between the improvement in convenience and the improvement in security in the image processing apparatus 1. The image data stored in the HDD 19 is transferred to a destination according to its purpose of use. Specifically, when formed into an image on a sheet, the image data is transferred to the image forming section 17, when transmitted to the computers 2 as image data, the image data is transferred to the communication section 20, and when facsimile-transmitted, the image data is transferred to the modem 14.

The data invalidating section (erasing means) 22 executes a data erasing function to invalidate the image data stored in the HDD 19 so as to be unusable by erasing or overwriting with predetermined data the image data stored in the HDD 19 according to an instruction from the control section 10. Since there are cases where even though erased, the data in the HDD 19 can be unerased because of the magnetism remaining in the HDD 19, the data may be overwritten with random data a plurality of times so that the unerasure of the data is more impossible.

The data processing section 23 is provided with means for performing an encryption processing on the image data read from the original by the image reading section 15, the image data received from the external facsimile apparatus 4 and the image data obtained by developing a print job received from the external computers 2, and transfers the encrypted data (image data) obtained by the encryption processing to the HDD 19 for storage. The data processing section 23 also encrypts historical data described later comprising image data and processing information. The data processing section 23 is also provided with means for performing a decryption processing on the encrypted data read out from the HDD 19 by the control from the control section 10, and the decrypted image data is transferred to a destination according to its purpose of use. Specifically, when formed into an image on a sheet, the image data is transferred to the image forming section 17, when transmitted to the computers 2 as image data, the image data is transferred to the communication section 20, and when facsimile-transmitted, the image data is transferred to the modem 14. The data processing section 23 also decrypts the encrypted historical data obtained from the server apparatus 3. As described above, the data processing section 23 stores an encryption key used for the encryption processing and the decryption processing, and operates as key storing means.

With the above-described structure, the image processing apparatus 1 functions as a facsimile apparatus in which the original placed on a non-illustrated predetermined original table by the user is read by the image reading section 15, the obtained image data is transmitted to the facsimile apparatus 4 connected to the public telephone line network 101 through the modem 14 and the NCU 13 and the image data transmitted by the external facsimile apparatus 4 by facsimile communication is received through the public telephone line network 101.

The image processing apparatus 1 also functions as a copying apparatus in which the image reading section 15 reads the original and an image based on the obtained image data is copied onto a recording sheet by the image forming section 17. Moreover, the image processing apparatus 1 also functions as a network scanner in which the image data read from the original by the image reading section 15 is transmitted from the communication section 20 to the computers 2 connected to the communication network 100. Further, the image processing apparatus 1 also functions as a network printer in which an image based on the data externally received by the communication section 20 through the communication network 100 is recorded onto a recording sheet by the image forming section 17.

In the image processing apparatus 1 of the first embodiment, when an instruction to execute various image processings as described above is accepted by the user operating the operation panel 18, the information related to the image processing represented by the accepted execution instruction and the image data subjected to the image processing are outputted as historical data (historical information) from the communication section (output means) 20 to the server apparatus 3 connected to the communication network 100, and are stored in the server apparatus 3.

Specifically, for example, when an instruction to execute the copying processing is accepted from the user through the operation panel 18, the control section 10 reads the original placed on the predetermined original table by the image reading section 15, and temporarily stores the image data in the HDD 19. Then, the control section 10 transmits, to the server apparatus 3, the processing information related to the copying processing represented by the execution instruction inputted from the operation panel 18 and the image data stored in the HDD 19 as one piece of historical data.

Moreover, for example, when an instruction to execute the facsimile transmission processing is accepted from the user through the operation panel 18, the control section 10 reads the original placed on the predetermined original table by the image reading section 15, and temporarily stores the image data in the HDD 19. Then, the control section 10 transmits, to the server apparatus 3, the processing information related to the facsimile transmission information represented by the execution instruction inputted from the operation panel 18 and the image data stored in the HDD 19 as historical data.

The above-mentioned processing information includes, for example, the execution date of the image processing, the information related to the obtaining information when image data is obtained, the information related to the image processing when the obtained image data is outputted onto a sheet as an image, and the information related to the transmission processing when the obtained image data is transmitted to the outside. More specifically, examples of the information related to the obtaining processing include the obtaining route of the image data, the facsimile number of the facsimile apparatus 4 that transmitted the image data and the IP addresses of the computers 2. Examples of the information related to the image processing include the number of sheets, the number of copies, the density, the reduction ratio and the enlargement ratio. Examples of the information related to the transmission processing include the facsimile number of the facsimile apparatus 4 and the IP addresses of the computers 2 to which the image data is transmitted.

In a case where user authentication is mandatory when the user uses the image processing apparatus 1, the user information that can be obtained when authentication is performed is included in the processing information when the processing information is transmitted to the server apparatus 3. In this case, since the user who performed the image processing represented by each piece of historical data managed by the server apparatus 3 can be grasped, when the image data is unauthorizedly used, the culprit can be tracked with reliability.

Figure 2:
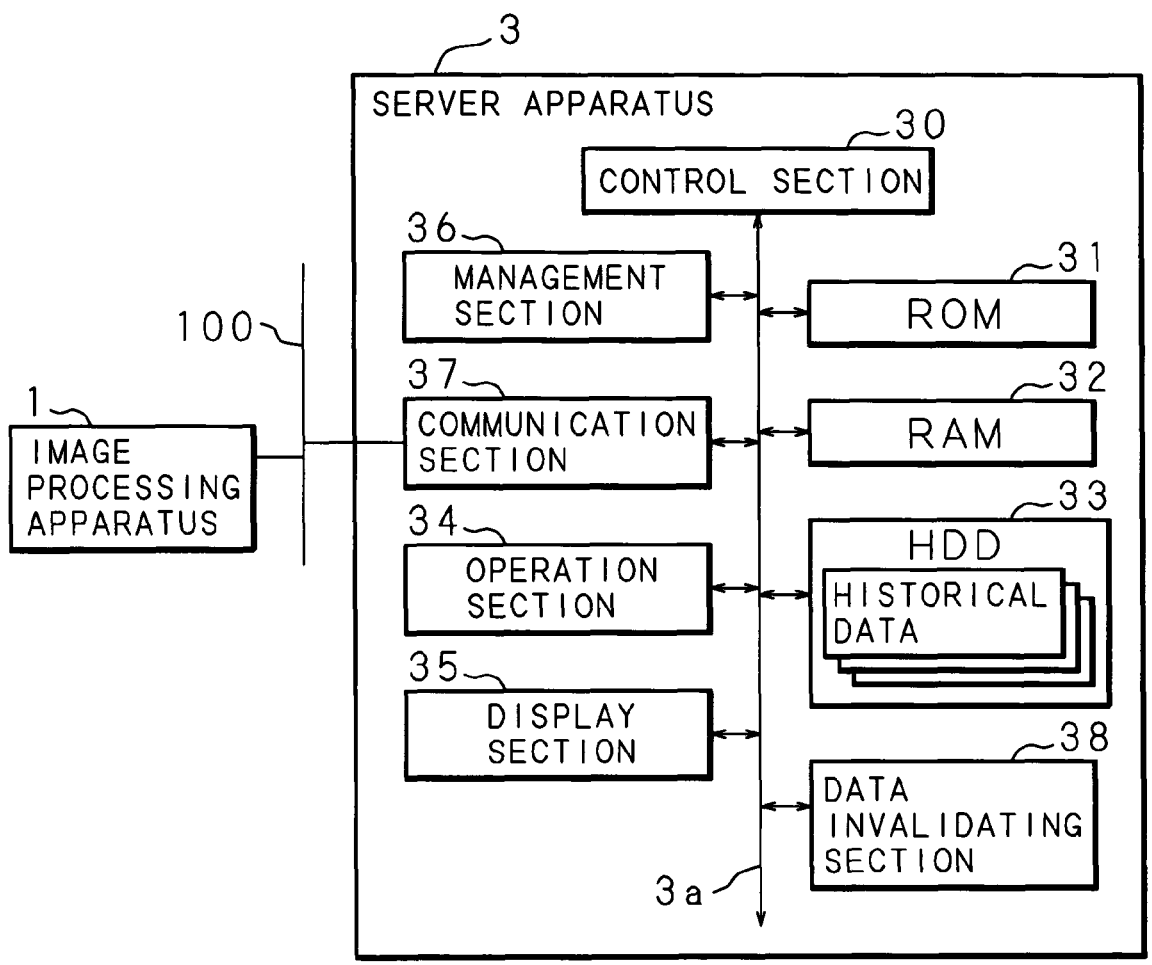
FIG. 2 is a block diagram showing an example of the internal structure of a server apparatus according to the first to third embodiments.

FIG. 2 is a block diagram showing an example of the internal structure of the server apparatus 3 according to the first embodiment. The server apparatus 3 is provided with a control section 30, a ROM 31, a RAM 32, an HDD 33, an operation section 34 having a keyboard, a mouse and the like, a display section 35 comprising a liquid crystal display or a CRT display, a management section 36, a communication section 37 for connection to the communication network 100 and a data invalidating section 38. These components are interconnected through a bus 3a. The control section 30, which comprises a CPU or an MPU having a timer (not shown), controls each hardware section as described above connected through the bus 3a and reads out a control program prestored in the ROM 31 into the RAM 32 as appropriate for execution.

The ROM 31 prestores programs such as various control programs and an authentication program necessary for causing the server apparatus 3 to operate as an external apparatus included in the image processing system according to the present invention. The RAM 32 comprises an SRAM or a flash memory, and temporarily stores the data generated when a control program is executed by the control section 30.

The management section 36 comprises, for example, a flash memory, and stores the information related to the hardware constituting the server apparatus 3 and the information related to the internal status of the apparatus. The management section 36 is structured so as to obtain these pieces of information by communicating with each hardware section when the power is turned on and update, whenever necessary, the contents of the information being managed, by periodically monitoring the status of the hardware in operation.

Moreover, the management section 36 stores the authentication information used for the authentication processing performed as appropriate while the server apparatus 3 is operating. As the authentication information, for example, an authentication number comprising a plurality of digits of numerals is prestored in the management section 36. When the authentication data is inputted from the operation section 34, the control section 30 reads out the authentication program stored in the ROM 31 into the RAM 32 and executes it to thereby determine whether or not the inputted authentication data coincides with the management information prestored in the management section 36 and when it coincides, authenticates the user as an authorized user or administrator.

The HDD 33 is a large-capacity storage device, and serves as external history storing means for storing the historical data outputted by the image processing apparatus 1 as mentioned above. In the HDD 33, each piece of historical data is stored in a condition of being arranged according to the file format of each piece of image data, the image processing such as copying, facsimile transmission or printer output or the folder created by the user. Moreover, when the server apparatus 3 is in normal operation, the control section 30 restricts the access to the HDD 33.

Specifically, when an instruction to read out or erase the historical data stored in the HDD 33 is provided, the control section 30 (access authenticating means) performs authentication, and for example, only when the user is authenticated as an authorized administrator of the server apparatus 3 or the image processing apparatus 1, the readout or the erasure of the historical data from the HDD 33 is permitted. When the readout of the historical data stored in the HDD 33 is permitted, that is, when the server apparatus 3 is operated by an authorized administrator, the historical data can be displayed for confirmation on the display section 35 of the server apparatus 3 or on the display section of the computers 2 connected through the communication network 100.

The data invalidating section 38 executes a data erasing function to invalidate the image data stored in the HDD 33 so as to be unusable by erasing or overwriting with predetermined data the image data stored in the HDD 33 according to an instruction from the control section 30.

In the image processing system of the above-described structure, when the image processing apparatus 1 transmits the historical data to the server apparatus 3 as described above by accepting an instruction to execute an image processing through the operation panel 18, the control section 30 of the server apparatus 3 obtains the historical data transmitted from the image processing apparatus 1 and successively stores it into the HDD 33. When the storage of the historical data obtained from the image processing apparatus 1 into the HDD 33 is completed, the control section 30 transmits an obtaining completion signal representative of the completion of obtaining of the historical data from the communication section 37 to the image processing apparatus 1.

When the obtaining completion signal transmitted from the server apparatus 3 is obtained by the communication section (obtaining means) 20, the control section 10 of the image processing apparatus 1 starts the image processing corresponding to the image data stored in the HDD 19 according to the execution instruction accepted through the operation panel 18. Moreover, when the image processing according to the accepted execution instruction is completed, the control section 10 erases the image data subjected to the processing from the HDD 19 by the data invalidating section 22. The image data stored in the HDD 19 may be invalidated by being overwritten with predetermined data as well as erased by the data invalidating section 22.

As described above, when an image processing is performed on the image data temporarily stored in the HDD 19, the image processing apparatus 1 executes a historical data management processing to store the image data, subjected to the processing, itself and the processing information related to the image processing in the server apparatus 3 as historical data. Moreover, in the present embodiment, the start and end of the historical data management processing in the server apparatus 3 and the confirmation and erasure of the historical data stored in the server apparatus 3 are permitted only when the authentication by the administrator of the image processing apparatus 1 and the server apparatus 3 is performed and the user is authenticated as authorized.

The start and end of the historical data management processing in the server apparatus 3 and the confirmation and erasure of the historical data may also be performed by an operation of the operation panel 18 of the image processing apparatus 1 or an operation of the operation section 34 of the server apparatus 3. In the description given below, a case where the start and end of the historical data management processing are performed by operating the operation panel 18 of the image processing apparatus 1 and the confirmation and erasure of the historical data are performed by operating the operation section 34 of the server apparatus 3 will be shown as an example.

The processing will be described that is performed by the control section 10 when the administrator of the image processing apparatus 1 performs an operation to provide an instruction to start or end the historical data management processing. When the administrator operates a predetermined operation button of the operation panel 18 in order to perform an operation that only the administrator is permitted to perform, the control section 10 of the image processing apparatus 1 displays an administrator authentication screen as shown in FIG. 3A on the operation panel 18. The various pieces of screen information displayed on the operation panel 18 are prestored in the ROM 11.

According to the administrator authentication screen shown in FIG. 3A, the administrator inputs the authentication data assigned to the administrator with the numeric keypad of the operation panel 18 and operates the "Authenticate" button. When the "Authenticate" button is operated, the control section 10 determines whether the authentication information for administrator authentication stored in the management section 21 coincides with the inputted authentication data or not, and when it does not coincide, it is indicated that the user is not authenticated as the administrator on the operation panel 18 to notify it to the user.

On the other hand, when the user is authenticated as the administrator, the control section 10 displays an administrator operation screen as shown in FIG. 3B on the operation panel 18. The administrator operation screen is a screen for selecting between the operations of "Start historical data management processing" and "End historical data management processing" that only the administrator is permitted to perform, and the administrator selects either one.

When the administrator selects "Start historical data management processing," the control section 10 displays a management condition setting screen as shown in FIG. 3C on the operation panel 18. The management condition setting screen is a screen for setting whether to transmit the corresponding historical data to the server apparatus 3 or not when an instruction to execute various processings is accepted. The administrator selects the kind of processing for which the historical data is to be managed from among "Copy," "Fax" and "Printer," and operates the "Set" button. On the management condition setting screen, not only one but also two or all of "Copy," "Fax" and "Printer" can be selected, and whether to perform the management of the historical data or not can be set for each processing.

When the administrator operates the "Set" button on the management condition setting screen shown in FIG. 3C, the control section (setting means) 10 sets the selected kind of processing as the object of the historical data management processing. By doing this, when an instruction to execute the set kind of processing is accepted, the control section 10 transmits, to the server apparatus 3, the image data read from the original as the object of processing or the image data externally received as the object of processing, and the processing information related to each processing represented by the accepted execution instruction as historical data.

Specifically, when an instruction to execute the copying processing (copy) or the facsimile transmission processing is accepted from the user, the control section 10 of the image processing apparatus 1 temporarily stores the image data read by the original by the image reading section 15 in the HDD 19, and then, transmits the image data to the server apparatus 3 as historical data together with various processing conditions in the copying processing or the facsimile transmission processing and the date and time information indicated by the timer of the control section 10. In the image processing apparatus 1 having transmitted the historical data to the server apparatus 3, the control section 10 waits until the obtaining completion signal representative of the completion of obtaining of the historical data is returned from the server apparatus 3. When the communication section 20 obtains the obtaining completion signal, the control section 10 transfers the image data stored in the HDD 19 to the image forming section 17 or to the modem 14 according to the accepted execution instruction, and executes the processing of image formation on a sheet or the facsimile transmission processing. Further, when the image formation processing or the facsimile transmission processing is completed, the control section 10 erases the image data subjected to the processing from the HDD 19 by the data invalidating section 22.

Moreover, when the image processing apparatus 1 performs the facsimile reception processing or the image formation processing based on the data received from the external computers 2, the control section 10 temporarily stores the image data received through the NCU 13 and the modem 14 or through the communication section 20 in the HDD 19, and then, transmits the image data to the server apparatus 3 as historical data together with various processing conditions in the facsimile reception processing or the processing of data reception from the computers 2 and the date and time information indicated by the timer of the control section 10. In the image processing apparatus 1 having transmitted the historical data to the server apparatus 3, the control section 10 waits until the obtaining completion signal representative of the completion of obtaining of the historical data is returned from the server apparatus 3. When the communication section 20 obtains the signal, the control section 10 transfers the image data stored in the HDD 19 to the image forming section 17 according to the accepted execution instruction, and executes the processing of image formation on a sheet. Further, when the image formation processing is completed, the control section 10 erases the image data subjected to the processing from the HDD 19 by the data invalidating section 22.

As described above, by storing the image data subjected to the processing in the server apparatus 3 when the image processing apparatus 1 performs various image processings, the historical data in the image processing performed by the image processing apparatus 1 can be managed by the server apparatus 3. Moreover, by storing the processing information related to each processing as historical data together with the image data subjected to the processing, which image data was used, when the image data was used and for which processing the image data was used can be grasped. Further, by transmitting the historical data to the server apparatus 3 before the image processing is performed, the image data fetched in the image processing apparatus 1 to execute the image processing can be reliably managed as historical data.

On the other hand, when the administrator selects "End historical data management processing" on the administrator operation screen shown in FIG. 3B, the control section 10 ends the processing to store the historical data in the server apparatus 3 when the image processing apparatus 1 accepts the execution instruction of various processings as described above. Also when the historical data management processing is ended, since the control section (stop authenticating means) 10 performs the administrator authentication as shown in FIG. 3A and can end the historical data management processing only when the user is authenticated as an authorized administrator, it never occurs that security is inadvertently reduced by an unauthorized person ending the historical data management processing.

The processing will be described that is performed by the control section 30 of the server apparatus 3 when the administrator of the server apparatus 3 confirms or erases the historical data stored in the HDD 33. When the administrator appropriately operates the operation section 34 in order to confirm or erase the historical data, the control section 30 displays an administrator authentication screen as shown in FIG. 4A on the display section 35. The various pieces of screen information displayed on the display section 35 are prestored in the ROM 31.

According to the administrator authentication screen shown in FIG. 4A, the administrator inputs the authentication data assigned to the administrator with the numeric keypad of the operation section 34 and operates the "Authenticate" button, for example, by use of a mouse. When the "Authenticate" button is operated, the control section 30 determines whether the authentication information for administrator authentication stored in the management section 36 coincides with the inputted authentication data or not, and when it does not coincide, it is indicated that the user is not authenticated as the administrator on the display section 35 to notify it to the user.

On the other hand, when the user is authenticated as the administrator, the control section 30 displays an administrator operation screen as shown in FIG. 4B on the display section 35. The administrator operation screen is a screen for selecting between the processings of "Confirm historical data" and "Erase historical data" that only the administrator is permitted to perform, and the administrator selects either one.

Figure 5A:
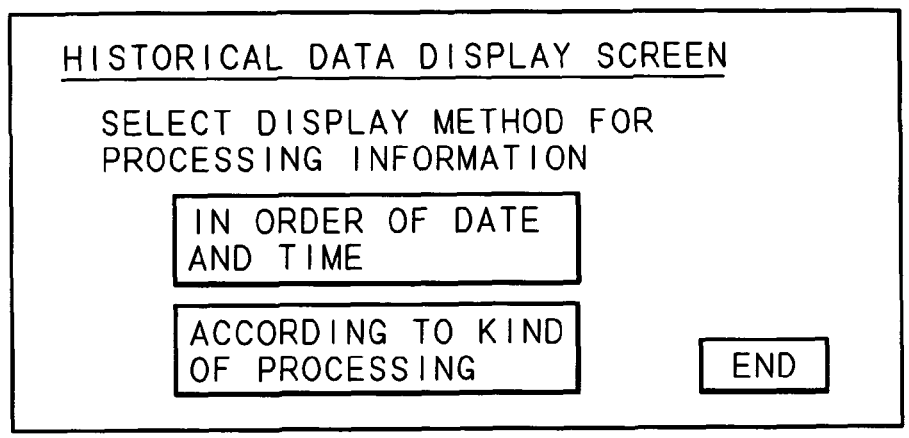

When the administrator selects "Confirm historical data," the control section 30 displays a historical data display screen as shown in FIG. 5A on the display section 35. In the first embodiment, in selecting a desired piece of historical data from the historical data stored in the HDD 33, the processing information of the processing represented by each piece of historical data is used, and the historical data display screen shown in FIG. 5A is a screen for selecting whether to display the processing information in the order of date and time or in the order of date and time according to the kind of processing.

Figure 5B:
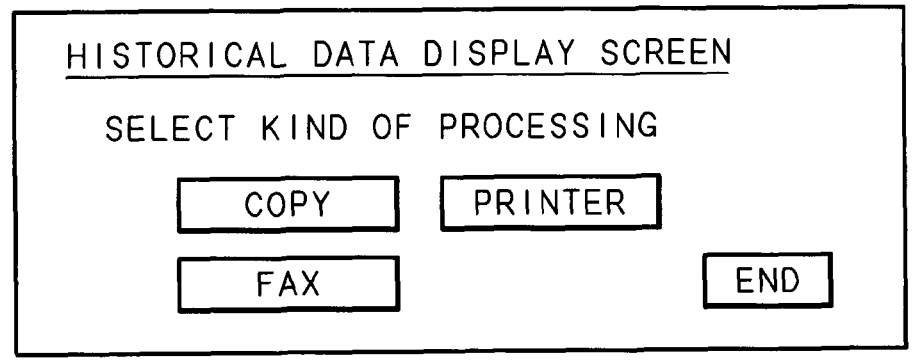

When the administrator selects "In order of date and time" on the historical data display screen, the control section 30 lists the processing information corresponding to each of all the pieces of historical data stored in the HDD 33 in the order of date and time on the display section 35. Moreover, when the administrator selects "According to kind of processing," the control section 30 displays the historical data display screen shown in FIG. 5B on the display section 35, and prompts the administrator to select the kind of processing whose processing information is to be displayed.

When the administrator selects the kind of processing whose processing information is to be displayed, the control section 30 reads out the processing information corresponding to the selected kind of processing from the HDD 33 and displays it in the order of date and time on the display section 35. For example, when the administrator selects "Fax," the control section 30 displays the processing information representative of the historical data in the facsimile transmission processing and the facsimile reception processing on the display section 35 as shown in FIG. 5C.

The administrator identifies, from the processing information list, the processing information representative of the historical data to be displayed for confirmation on the display section 35, selects the identified processing information, and operates the OK button. When the administrator operates the OK button, the control section 30 reads out the historical data corresponding to the selected processing information from the HDD 33 and displays it on the display section 35. As described above, even when the historical data stored in the HDD 33 is displayed, by performing administrator authentication according to the administrator authentication screen shown in FIG. 4A, the readout of the historical data by unauthorized persons can be inhibited.

On the historical data display screen shown in FIG. 5D, the processing information and the image data in the historical data being read out, and a "Print" button for the image output of the displayed historical data onto a sheet are displayed. The administrator operates the "Print" button when intending to perform the image output of the displayed historical data. When the "Print" button is operated, the control section 30 outputs the historical data read out from the HDD 33 as a print job from the communication section 37 to the image processing apparatus 1.

Figure 6A:
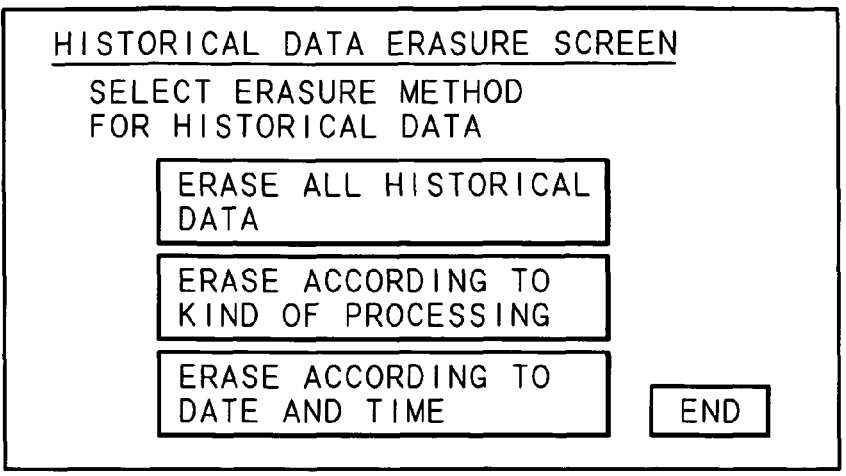
FIGS. 6A to 6D are schematic views showing an example of the arrangement of a historical data erasure screen.

On the other hand, when the administrator selects "Erase historical data" on the administrator operation screen shown in FIG. 4B, the control section 30 displays a historical data erasure screen as shown in FIG. 6A on the display section 35. The historical data erasure screen is a screen for selecting the erasing method from among "Erase all historical data," "Erase according to kind of processing" and "Erase according to date and time" with respect to the historical data stored in the HDD 33.

Figure 6B:
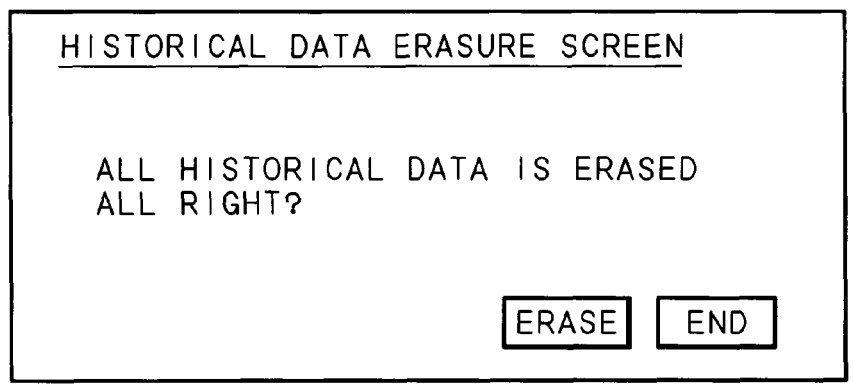

When the administrator selects "Erase all historical data," the control section 30 displays a confirmation screen as shown in FIG. 6B on the display section 35, and when the "Erase" button is operated by the administrator, all the historical data stored in the HDD 33 is erased by the data invalidating section 38. The historical data stored in the HDD 33 may be invalidated by being overwritten with predetermined data as well as erased by the data invalidating section 38.

Figure 6C:
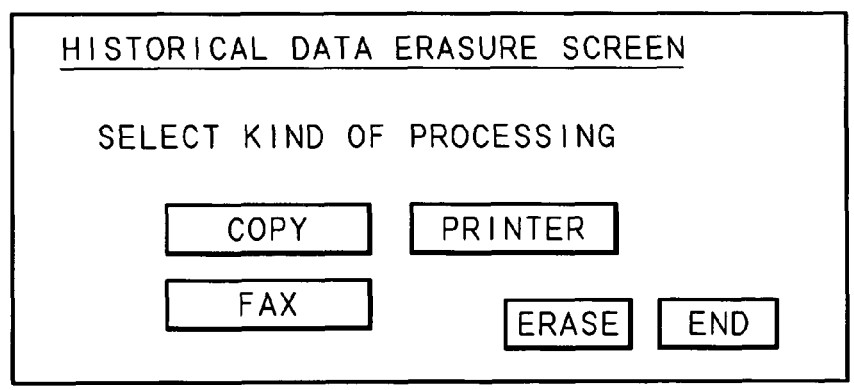

When the administrator selects "Erase according to kind of processing," the control section 30 displays, on the display section 35, a screen for selecting the kind of processing whose historical data is to be erased from the HDD 33 as shown in FIG. 6C. When the administrator selects the kind of processing whose historical data is to be erased and operates the "Erase" button on the historical data erasure screen shown in FIG. 6C, the control section 30 erases the piece of historical data, corresponding to the selected processing, of the historical data stored in the HDD 33 by the data invalidating section 38.

Figure 6D:
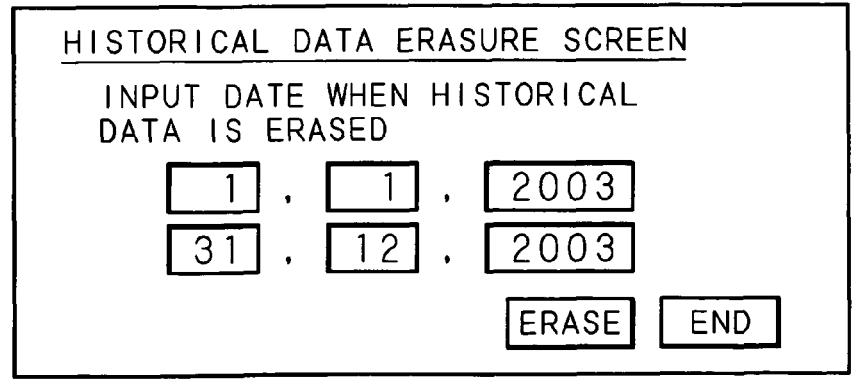

When the administrator selects "Erase according to date and time," the control section 30 displays, on the display section 35, a screen for inputting the date and time in the historical data to be erased from the HDD 33 as shown in FIG. 6D. When the administrator inputs a desired date and time with the numeric keypad and operates the "Erase" button on the historical data erasure screen shown in FIG. 6D, the control section 30 erases the piece of historical data, corresponding the range of the inputted date and time, of the historical data stored in the HDD 33 by the data invalidating section 38.

As described above, also when the historical data stored in the HDD 33 is erased, by performing the administrator authentication according to the administrator authentication screen shown in FIG. 4A and permitting only the authorized administrator to erase the historical data, the erasure of the historical data by unauthorized persons can be inhibited, the historical data of the image processing performed by the image processing apparatus 1 can be reliably managed in the server apparatus 3, and the unnecessary historical data can be erased by the administrator, so that the HDD 33 can be effectively used.

Further, when the user information is included in the processing information in the historical data stored in the HDD 33, as described above, the historical data can be erased not only according to the kind of processing or the date and time but also according to the user, so that the historical data related to the processing performed by a user who no longer uses the image processing apparatus 1, for example, because of being transferred to another office can be selected and erased.

Figure 7:
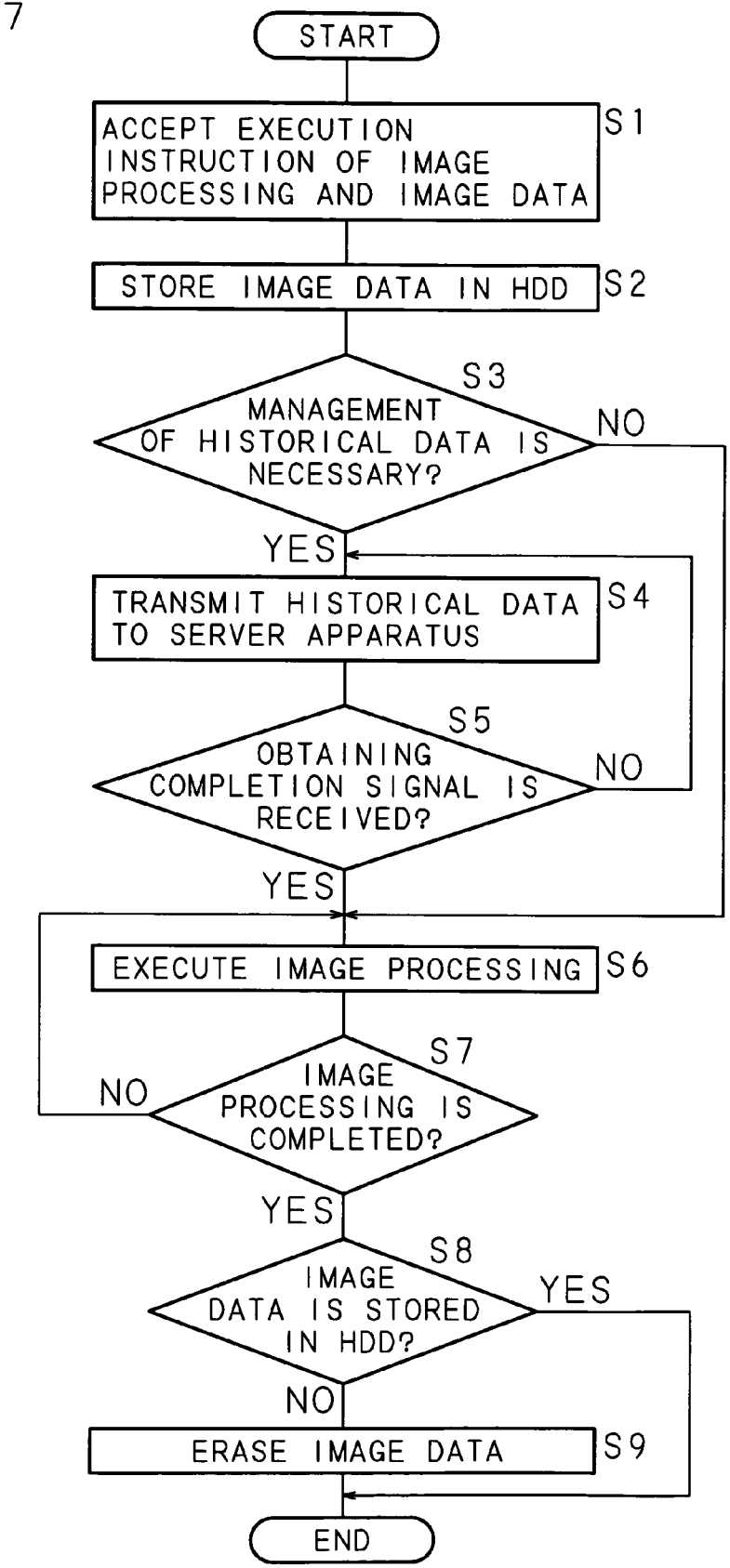
FIG. 7 is a flowchart showing the procedure of a historical data management processing.

The operation will be described that is performed by the image processing apparatus 1 when the start of the historical data management processing is set by the administrator as described above. FIG. 7 is a flowchart showing the procedure of the historical data management processing by the image processing apparatus 1 according to the first embodiment. The procedure described below is executed by the control section 10 according to a program stored in the ROM 11.

In the image processing apparatus 1 in normal operation, when an instruction to execute the copying processing or the facsimile transmission processing is accepted by an operation of the operation panel 18 by the user, when the NCU 13 and the modem 14 receive facsimile data or when the communication section 20 receives a print job, the control section 10 accepts the image data subjected to the processing together with the instruction to execute various image processings (S1). The control section 10 temporarily stores, in the HDD 19, the accepted image data, specifically, the image data read from the original by the image reading section 15, the image data obtained by developing the facsimile data received through the modem 14 or the image data obtained by developing the print job received through the communication section 20 (S2).

Then, the control section 10 determines whether or not it is necessary to manage the historical data related to the image data stored in the HDD 19 at step S2 based on whether or not a setting is made so as to perform the historical data management processing on the image processing the execution instruction of which is accepted at step S1 (S3). When determining that the management of the historical data is necessary (YES at S3), the control section 10 transmits the image data stored in the HDD 19 and the processing information related to the image processing the execution instruction of which is accepted at step S1 from the communication section 20 to the server apparatus 3 as historical data (S4). When determining that the management of the historical data is unnecessary (NO at S3), the control section 10 shifts the procedure to step S6.

The control section 10 determines whether or not the obtaining completion signal representative of the completion of obtaining of the historical data is received from the server apparatus 3 transmitting the historical data (S5). When determining that the obtaining completion signal is not received (NO at S5), the control section 10 continues the transmission of the historical data to the server apparatus 3 until the obtaining completion signal is received (S4). When determining that the obtaining completion signal is received (YES at S5), the control section 10 executes the image processing according to the execution instruction accepted at step S1, on the image data stored in the HDD 19 at step S2 (S6).

Specifically, when an instruction to execute the processing of image output onto a sheet is provided, the image data stored in the HDD 19 is transferred to the image forming section 17, when an instruction to execute the facsimile transmission processing is provided, the image data stored in the HDD 19 is transferred to the modem 14, and when an instruction to execute the network transmission processing is provided, the image data stored in the HDD 19 is transferred to the communication section 20.

The control section 10 determines whether the executed image processing is completed or not (S7). When determining that the image processing is not completed (NO at S7), the control section 10 continues the image processing until the completion (S6), and when determining that the image processing is completed (YES at S7), the control section 10 determines whether to store the image data subjected to the executed image processing in the HDD 19 or not based on the setting from the user or the administrator (S8). When determining that the image data is stored in the HDD 19 (YES at S8), the control section 10 ends the processing without performing any operation, and when determining that the image data is not stored in the HDD 19 (NO at S8), the control section 10 erases the image data stored in the HDD 19 at step S2 by the data invalidating section 22 (S9), and ends the procedure.

As described above, when the image processing apparatus 1 accepts an instruction to execute the copying processing, the facsimile communication processing or the network communication processing, by transmitting to the server apparatus 3 the image data subjected to the processing together with the processing information related to each processing as historical data and storing it in the HDD 33 of the server apparatus 3, with respect to each piece of image data, when it was used and for which processing it was used can be grasped. Moreover, in the case of a structure where user authentication is mandatory when each user uses the image processing apparatus 1, since the user information as well as the processing information can be managed for each piece of processed image data, unauthorized use of the image data can be prevented. Moreover, with respect to unauthorizedly used image data, when it was used, who used it and for which processing it was used can be grasped.

(Second Embodiment)

Figure 8:
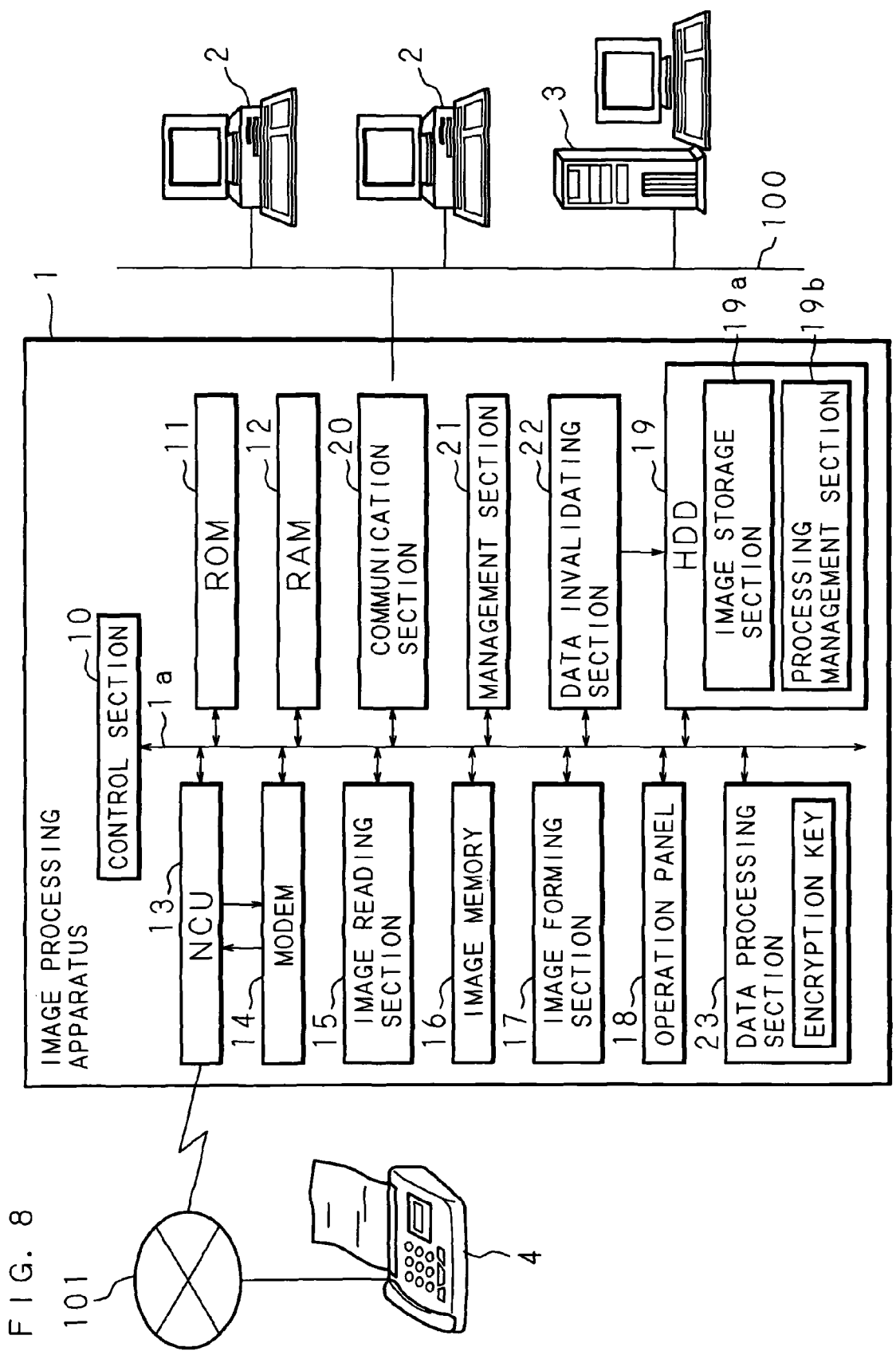
FIG. 8 is a block diagram showing an example of the internal structure of an image processing apparatus according to the second and third embodiments.

FIG. 8 is a block diagram showing an example of the internal structure of an image processing apparatus 1 according to a second embodiment. In FIG. 8, similar elements to those of FIG. 1 are denoted by the same reference numerals and descriptions thereof are omitted. The server apparatus 3 of the second embodiment will not be described because it is the same as the server apparatus 3 of the above-described first embodiment.

In the image processing apparatus 1 of the second embodiment, the HDD 19 has an image storage section (data storing means) 19a that stores, for reuse, the image data read from the original by the image reading section 15, the image data received from the external facsimile apparatus 4 and the image data obtained by developing a print job received from the external computers 2; and a processing management section (history storing means) 19b that stores, when an instruction to execute various image processings by the user operating the operation panel 18, the information related to the image processing represented by the accepted execution instruction and the image data subjected to the image processing as historical data.

The image data stored in the image storage section 19a can be read out for reuse as required when an image that has been outputted once is required to be outputted again for a reason such as failure of output or shortage of the number of output copies, or according to an instruction from the user or an instruction transmitted from the computers 2 and received by the communication section 20. By doing this, the image processing apparatus 1 functions as a file server apparatus for the data. While the convenience by the reuse of the image data can be improved when the image data is stored in the image storage section 19a, when the image data is not stored in the image storage section 19a, since leakage of image data from the image storage section 19a can be prevented, the security of the image processing apparatus 1 can be improved.

Therefore, it is necessary for the user and the administrator of the image processing apparatus 1 only to set whether to store the image data in the image storage section 19a or not according to the order of priority between the improvement in convenience and the improvement in security in the image processing apparatus 1. The image data stored in the image storage section 19a is transferred to a destination according to its purpose of use. Specifically, when formed into an image on a sheet, the image data is transferred to the image forming section 17, when transmitted to the computers 2 as image data, the image data is transferred to the communication section 20, and when facsimile-transmitted, the image data is transferred to the modem 14.

On the other hand, in the processing management section 19b, each piece of historical data is stored in a condition of being arranged according to the file format of each piece of image data, the image processing such as copying, facsimile transmission or printer output, or the folder created by the user. Moreover, when the image processing apparatus 1 is in normal operation, the control section 10 restricts the access to the processing management section 19b. For example, only when the user is authenticated as authorized by the authentication by the administrator of the image processing apparatus 1 and the server apparatus 3, the readout of the historical data stored in the processing management section 19b is permitted.

In the image processing apparatus 1 of the second embodiment, when an instruction to execute various image processings is accepted by the user operating the operation panel 18, the information related to the image processing represented by the accepted execution instruction and the image data obtained as the object of the image processing and stored in the image storage section 19a of the HDD 19 are stored in the processing management section 19b as historical data.

Specifically, for example, when an instruction to execute the copying processing or the facsimile transmission processing is accepted from the user through the operation panel 18, the control section 10 reads the original placed on the predetermined original table by the image reading section 15 and temporarily stores the image data in the image storage section 19a of the HDD 19. Then, the control section 10 stores (copies), in the processing management section 19b, the processing information in the copying processing or the facsimile transmission processing represented by the execution instruction inputted from the operation panel 18 and the image data stored in the image storage section 19a as historical data. Moreover, the control section 10 transfers the image data stored in the image storage section 19a according to the accepted execution instruction to the image forming section 17 or to the modem 14, and executes the processing of image formation on a sheet or the facsimile transmission processing.

Moreover, when the image processing apparatus 1 performs the facsimile reception processing or the image formation processing based on the data received from the external computers 2, the control section 10 temporarily stores the image data received through the NCU 13 and the modem 14 or through the communication section 20 in the image storage section 19a of the HDD 19. Then, the control section 10 stores the processing information in the facsimile reception processing or the processing of data reception from the computers 2 and the image data stored in the image storage section 19a, in the processing management section 19b as historical data. Moreover, the control section 10 transfers the image data stored in the image storage section 19a to the image forming section 17, and executes the processing of image formation on a sheet.

Also in the second embodiment, the above-mentioned processing information includes: the date and time of execution of the image processing; the number of sheets, the number of copies, the density, the reduction ratio and the enlargement ratio when an image based on the image data is outputted onto a sheet; and the facsimile number of the facsimile apparatus 4 to which the image data is transmitted and the IP addresses of the computers 2 transmitting the image data when an image processing based on the externally received data is performed. Moreover, in a case where user authentication is mandatory when the user uses the image processing apparatus 1, the user information that can be obtained when authentication is performed is also included in the processing information when the processing information is stored in the processing management section 19b.

As described above, by storing the image data subjected to the processing in the processing management section 19b different from the image storage section 19a of the HDD 19 when the image processing apparatus 1 performs various image processings, the image data can be managed as historical data in the image processing apparatus 1. Moreover, by storing the processing information related to each processing as historical data together with the image data subjected to the processing, which image data was used, when the image data was used and for which processing the image data was used can be grasped.

In the image processing system of the second embodiment, the image processing apparatus 1 periodically transmits the historical data stored in the processing management section 19b of the HDD 19 from the communication section 20 to the server apparatus 3 as described above. The control section 30 of the server apparatus 3 to which the historical data is periodically transmitted from the image processing apparatus 1 obtains the historical data transmitted from the image processing apparatus 1 and successively stores it into the HDD 33. When the storage of the historical data obtained from the image processing apparatus 1 into the HDD 33 is completed, the control section 30 transmits the obtaining completion signal representative of the completion of obtaining of the historical data to the image processing apparatus 1.

When the obtaining completion signal transmitted from the server apparatus 3 is obtained by the communication section 20, the control section 10 of the image processing apparatus 1 erases the historical data stored in the processing management section 19b of the HDD 19 by the data invalidating section 22. The historical data in the processing management section 19b may be invalidated by being overwritten with predetermined data as well as erased by the data invalidating section 22.

As described above, when an image processing is performed on the image data temporarily stored in the image storage section 19a of the HDD 19, the image processing apparatus 1 stores, in the processing management section 19b, the image data, subjected to the processing, itself and the processing information related to the image processing as historical data. Moreover, by periodically transmitting the historical data stored in the processing management section 19b to the server apparatus 3 and storing it in the HDD 33 of the server apparatus 3, each piece of historical data can be managed more reliably.

In the second embodiment, the start and end of the historical data management processing in the processing management section 19b, the confirmation and erasure of the historical data stored in the processing management section 19b and the confirmation and erasure of the historical data stored in the server apparatus 3 are permitted only when the authentication by the administrator of the image processing apparatus 1 and the server apparatus 3 is performed and the user is authenticated as authorized.

The start and end of the historical data management processing in the processing management section 19b, the confirmation and erasure of the historical data stored in the processing management section 19b and the confirmation and erasure of the historical data stored in the server apparatus 3 can be performed by an operation of the operation panel 18 of the image processing apparatus 1 or an operation of the operation section 34 of the server apparatus 3, and descriptions thereof are omitted because they can be realized by similar processings to those described in the first embodiment.

Figure 9:
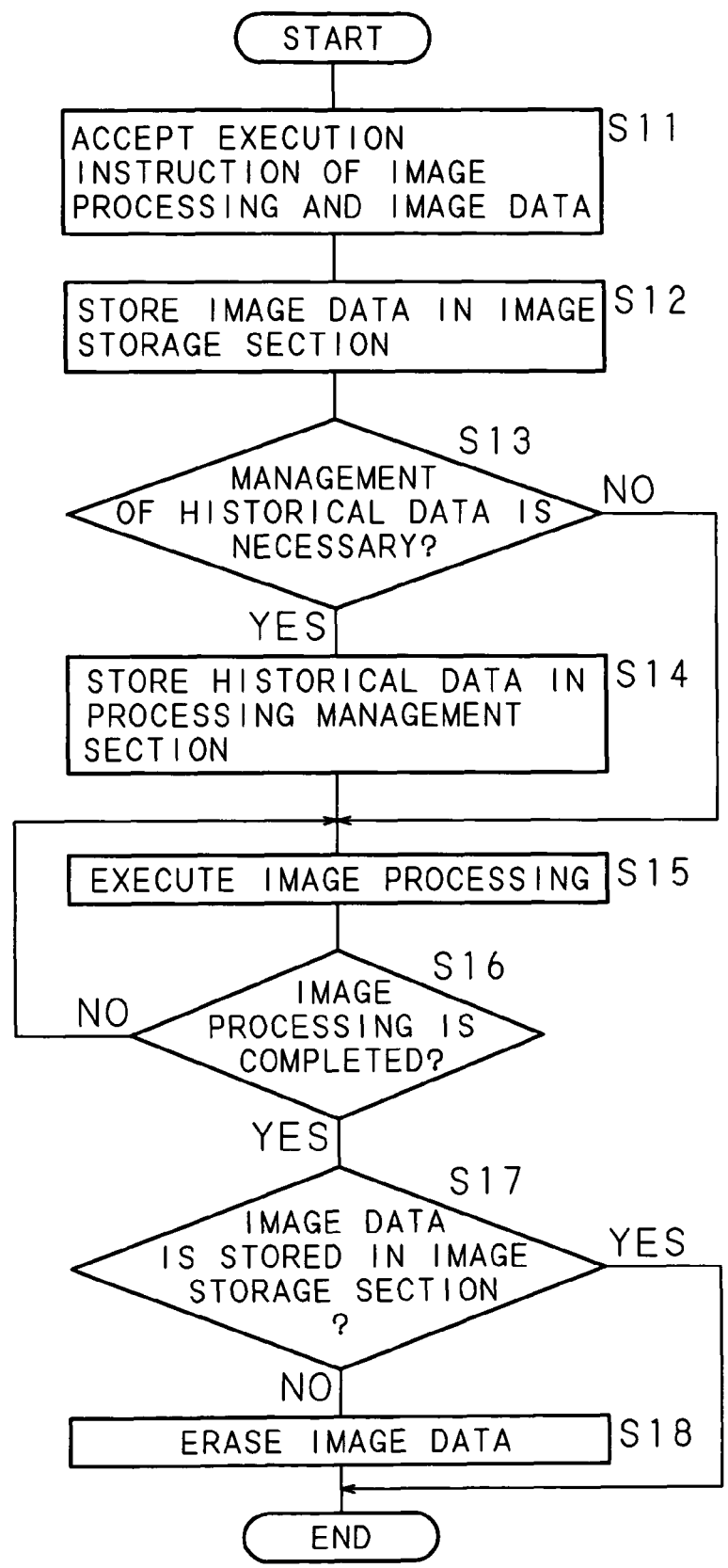
FIG. 9 is a flowchart showing the procedure of a historical data storage processing.

The operation performed by the image processing apparatus 1 when the start of the historical data management processing is set by the administrator as described above will be described. FIG. 9 is a flowchart showing the procedure of the processing of storage of the historical data into the processing management section 19b by the image processing apparatus 1 according to the second embodiment. The procedure described below is executed by the control section 10 according to a program stored in the ROM 11.

In the image processing apparatus 1 in normal operation, when an instruction to execute the copying processing or the facsimile transmission processing is accepted by an operation of the operation panel 18 by the user, when the NCU 13 and the modem 14 receive facsimile data or when the communication section 20 receives a print job, the control section 10 accepts the image data subjected to the processing together with the instruction to execute various image processings (S11). The control section 10 temporarily stores, in the image storage section 19a of the HDD 19, the accepted image data, specifically, the image data read from the original by the image reading section 15, the image data obtained by developing the facsimile data received through the modem 14 or the image data obtained by developing the print job received through the communication section 20 (S12).

Then, the control section 10 determines whether or not it is necessary to manage the historical data related to the image data stored in the image storage section 19a at step S12 based on whether or not a setting is made so as to perform the historical data management processing on the image processing the execution instruction of which is accepted at step S11 (S13). When determining that the management of the historical data is necessary (YES at S13), the control section 10 stores the image data stored in the image storage section 19a and the processing information related to the image processing the execution instruction of which is accepted at step S11 into the processing management section 19b of the HDD 19 as historical data (S14). When determining that the management as the historical data is unnecessary (NO at S13), the control section 10 shifts the procedure to step S15.

When the historical data is stored in the processing management section 19b, the control section 10 executes the image processing according to the execution instruction accepted at step S11, on the image data stored in the image storage section 19a at step S12 (S15). Specifically, when an instruction to execute the processing of image output onto a sheet is provided, the image data stored in the image storage section 19a is transferred to the image forming section 17, when an instruction to execute the facsimile transmission processing is provided, the image data stored in the image storage section 19a is transferred to the modem 14, and when an instruction to execute the network transmission processing is provided, the image data stored in the image storage section 19a is transferred to the communication section 20.

The control section 10 determines whether the executed image processing is completed or not (S16). When determining that the image processing is not completed (NO at S16), the control section 10 continues the image processing until the completion (S15), and when determining that the image processing is completed (YES at S16), the control section 10 determines whether to store the image data subjected to the executed image processing in the image storage section 19a of the HDD 19 or not based on the setting from the user or the administrator (S17). When determining that the image data is stored in the image storage section 19a (YES at S17), the control section 10 ends the procedure without performing any operation, and when determining that the image data is not stored in the image storage section 19a (NO at S17), the control section 10 erases the image data stored in the image storage section 19a of the HDD 19 at step S12 by the data invalidating section 22 (S18), and ends the procedure.

As described above, when the image processing apparatus 1 performs the copying processing, the facsimile communication processing or the network communication processing, by storing the image data subjected to the processing together with the processing information related to each processing in the processing management section 19b of the HDD 19 as historical data, with respect to each piece of image data, when it was used and for which processing it was used can be grasped. In the case of a structure where user authentication is mandatory when each user uses the image processing apparatus 1, since the user information as well as the processing information can be managed for each piece of processed image data, unauthorized use of the image data can be prevented. Moreover, with respect to unauthorizedly used image data, when it was used, who used it and for which processing it was used can be grasped.

Figure 10:
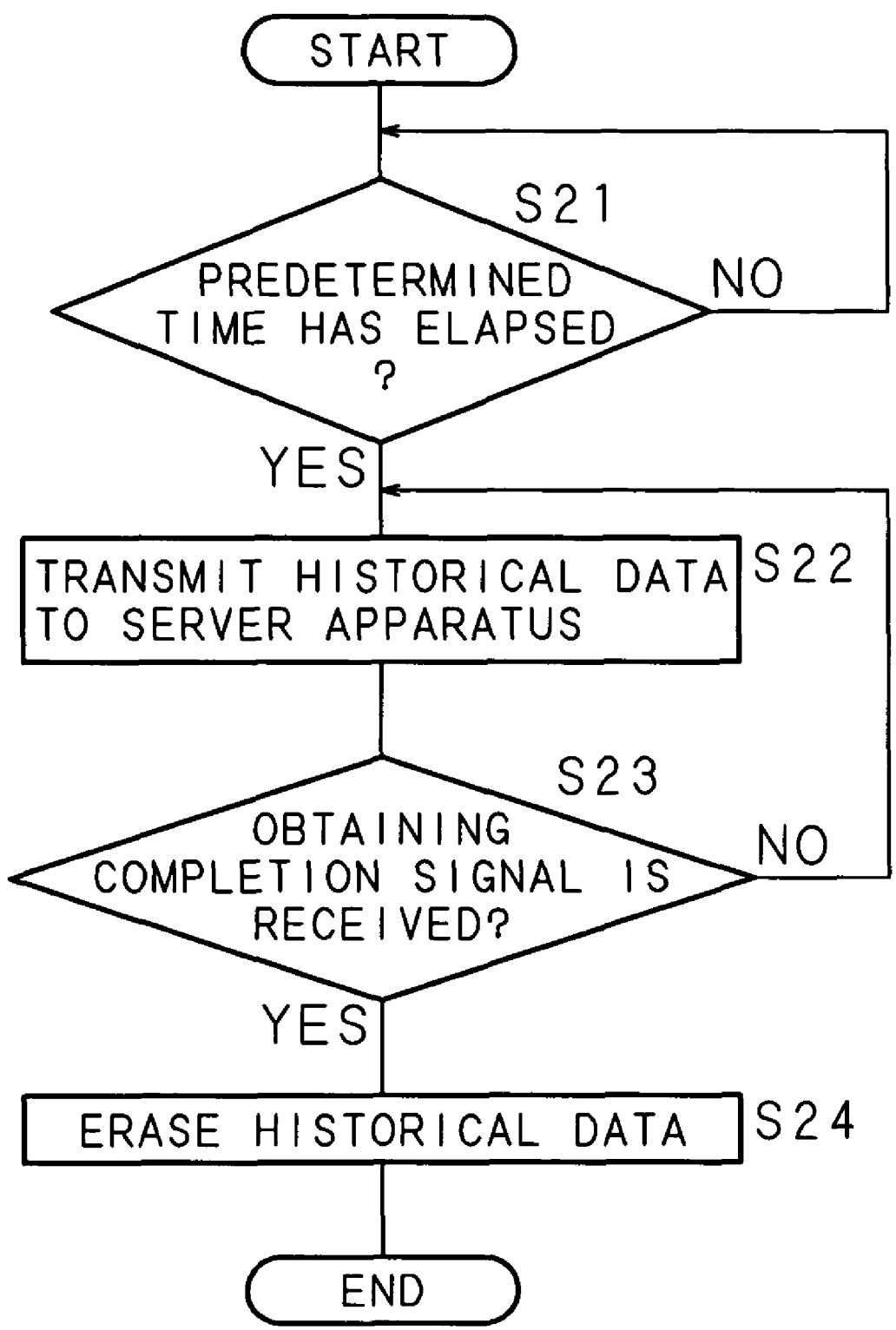
FIG. 10 is a flowchart showing the procedure of a historical data transfer processing.

The processing of the image processing apparatus 1 of the second embodiment to periodically transfer the historical data stored in the processing management section 19b to the server apparatus 3 as described above will be described. FIG. 10 is a flowchart showing the procedure of the processing of transfer of the historical data to the server apparatus 3 by the image processing apparatus 1 according to the second embodiment. The procedure described below is executed by the control section 10 according to a program stored in the ROM 11.

The control section 10 of the image processing apparatus 1 performs a determination as to whether a predetermined time has elapsed or not according to the time indicated by its own timer in addition to various processings such as the execution of the image processing and the storage of the historical data into the processing management section 19b as described above (S21). When determining that the predetermined time has not elapsed (NO at S21), the control section 10 waits until the elapse of the predetermined time while performing a processing other than the historical data transfer processing.

When determining that the predetermined time has elapsed (YES at S21), the control section 10 reads out the historical data stored up to this point of time from the processing management section 19b of the HDD 19, and transmits it to the server apparatus 3 (S22). The control section 10 determines whether or not the obtaining completion signal representative of the completion of obtaining of the historical data is received from the server apparatus 3 to which the historical data is transmitted (S23). When determining that the obtaining completion signal is not received (NO at S23), the control section 10 continues the transmission of the historical data to the server apparatus 3 until the obtaining completion signal is received (S22). When determining that the obtaining completion signal is received (YES at S23), the control section 10 erases the historical data transmitted to the server apparatus 3 from the processing management section 19b by the data invalidating section 22 (S24), and ends the procedure.

As described above, when the image processing apparatus 1 performs the copying processing, the facsimile communication processing or the network communication processing, by periodically transmitting the historical data successively stored in the processing management section 19*b* of the HDD 19 to the server apparatus 3 and managing it by the server apparatus 3, the historical data in the image processing performed by the image processing apparatus 1 can be reliably managed and the load on the communication network 100 imposed by the processing of historical data transfer from the image processing apparatus 1 to the server apparatus 3 can be reduced.

In the above-described first and second embodiments, a structure may be adopted such that when the historical data is transmitted from the image processing apparatus 1 to the server apparatus 3, the historical data is encrypted by the data processing section 23 and the encrypted historical data is stored in the server apparatus 3. In the case of a structure such that the encryption key is not transmitted to the server apparatus 3 and only the encrypted historical data is transmitted, even when the historical data leaks from the server apparatus 3, it is difficult to unauthorizedly use the historical data, so that the security of the image processing apparatus 1 can be improved. Further, in this case, by obtaining the encrypted historical data stored in the server apparatus 3 by use of the image processing apparatus 1 and decrypting it by the data processing section 23, the encrypted historical data managed by the server apparatus 3 can be confirmed.

Third Embodiment

The structure of the image processing apparatus 1 of the third embodiment is the same as that of the image processing apparatus 1 of the second embodiment (see FIG. 8) and the structure of the server apparatus 3 of the third embodiment is the same as that of the server apparatus 3 of the first and second embodiments (see FIG. 2). Therefore, descriptions thereof are omitted.

When the image processing apparatus 1 accepts an instruction to execute an image processing from the user through the operation panel 18, the processing information related to the image processing represented by the accepted execution instruction and the image data subjected to the image processing are stored in the processing management section 19*b* as historical data. Specifically, when the image processing apparatus 1 accepts, for example, an instruction to execute the copying processing from the user through the operation panel 18, the original placed on the predetermined original table is read by the image reading section 15, a predetermined encryption processing is performed on the image data by the data processing section 23, the encrypted image data is temporarily stored in the image storage section 19*a*, and then, the processing information related to the decryption processing represented by the accepted execution instruction and the image data (encrypted data) stored in the image storage section 19*a* are stored in the processing management section 19*b* as one piece of historical data.

Moreover, when the image processing apparatus 1 accepts, for example, an instruction to execute the facsimile transmission processing from the user through operation panel 18, the original placed on the predetermined original table is read by the image reading section 15, the predetermined encryption processing is performed on the image data by the data processing section 23, the encrypted image data is temporarily stored in the image storage section 19*a*, and then, the processing information related to the facsimile transmission processing represented by the accepted execution instruction and the image data stored in the image storage section 19*a* are stored in the processing management section 19*b* as one piece of historical data.

Moreover, in a case where user authentication is mandatory when the user uses the image processing apparatus 1, the user information that can be obtained when authentication is performed is also included in the processing information when the processing information is stored in the processing management section 19*b*. In this case, since the user who performed the image processing represented by each piece of historical data stored in the processing management section 19*b* can be grasped, when the image data is unauthorizedly used, the culprit can be identified with reliability.

In the processing management section 19*b*, each historical data is stored in a condition of being arranged according to the file format of each piece of image data, the image processing such as copying, facsimile transmission or printer output, or the folder created by the user. Moreover, when the image processing apparatus 1 is in normal operation, the control section 10 restricts the access to the processing management section 19*b*.

Specifically, when an instruction to read out or erase the historical data stored in the processing management section 19*b* is provided, the control section 10 performs authentication, and for example, only when the user is authenticated as an authorized administrator of the image processing apparatus 1, the readout or the erasure of the historical data from the processing management section 19*b* is permitted. When the readout of the historical data stored in the processing management section 19*b* is permitted, that is, when the image processing apparatus 1 is operated by an authorized administrator, the historical data can be displayed for confirmation on the operation panel 18 or on the display section of the computers 2 connected through the communication network 100.

In the image processing apparatus 1 of the third embodiment, when an instruction to execute various image processings is accepted by the user operating the operation panel 18, in addition to the processing to store the processing information related to the image processing represented by the accepted execution instruction and the image data subjected to the image processing in the processing management section 19*b* as historical data, a processing is performed to output the same historical data from the communication section (output means) 20 to the server apparatus 3 connected to the communication network 100 and store it in the server apparatus 3. The control section 30 (see FIG. 2) of the server apparatus 3 to which the historical data is transmitted from the image processing apparatus 1 obtains the historical data transmitted from the image processing apparatus 1 and successively stores it in the HDD 33.

In the image processing system of the third embodiment, when the image processing apparatus 1 accepts an instruction to execute an image processing through the operation panel 18, the administrator of the image processing apparatus 1 can select whether to perform the processing to store the historical data in the processing management section 19*b* as described above or perform the processing to transmit the historical data to the server apparatus 3 and store it in the server apparatus 3. Therefore, when an instruction to execute an image processing is accepted under a condition where the processing to store the historical data in the processing management section 19*b* is selected by the administrator, the image processing apparatus 1 stores the corresponding historical data in the processing management section 19*b*.

On the other hand, when an instruction to execute an image processing is accepted under a condition where the processing to store the historical data in the server apparatus 3 is selected by the administrator, the image processing apparatus 1 transmits the corresponding historical data to the server apparatus 3. Moreover, when an instruction to execute an image processing is accepted under a condition where the processing of storage in both is selected by the administrator, the image processing apparatus 1 stores the corresponding historical data in the processing management section 19b and transmits it to the server apparatus 3. Thus, when the image processing apparatus 1 accepts an instruction to execute an image processing, the control section 10 functions as control means for controlling one or both of the processing to store the historical data in the processing management section 19b and the processing to transmit the historical data to the server apparatus 3.

In the server apparatus 3 obtaining the historical data from the image processing apparatus 1, the control section 30 obtains the historical data transmitted from the image processing apparatus 1 and successively stores it into the HDD 33, and when the storage of the historical data into the HDD 33 is completed, the control section 30 transmits the obtaining completion signal representative of the completion of obtaining of the historical data from the communication section 37 to the image processing apparatus 1. By this, the control section 10 of the image processing apparatus 1 detects that the transmission of the historical data to the server apparatus 3 is completed, and executes the image processing corresponding to the image data stored in the image storage section 19a of the HDD 19 according to the execution instruction accepted through the operation panel 18.

When the image processing apparatus 1 performs various image processings, by storing the historical data related to the image data subjected to the processing in the processing management section 19b of the HDD 19 and/or the HDD 33 of the server apparatus 3, the historical data in the image processing performed by the image processing apparatus 1 can be managed. By storing the processing information related to each processing together with the image data subjected to the processing as historical data, which image data was used, when the image data was used and for which processing (kind of processing) the image data was used can be grasped as well as the contents themselves of the image data.

In the image processing apparatus 1 of the third embodiment, when a setting is made so as to store the historical data related to the image data subjected to the processing in both of the processing management section 19b of the HDD 19 and the HDD 33 of the server apparatus 3 when various image processings are performed, the control section (comparing means) 10 periodically compares the historical data stored in the processing management section 19b with the historical data stored in the HDD 33.

Specifically, the control section 10 of the image processing apparatus 1 communicates with the server apparatus 3 at predetermined time intervals, and requests the transmission of the processing information in the historical data stored in the HDD 33. In response to the request from the image processing apparatus 1, the control section 30 of the server apparatus 3 reads out the processing information included in the historical data stored in the HDD 33 and transmits it from the communication section 37. The control section 10 of the image processing apparatus 1 compares the processing information transmitted from the server apparatus 3 with the processing information included in the historical data stored in the processing management section 19b of the HDD 19.

By doing this, when it is determined that the historical data stored in the processing management section 19b and the historical data stored in the HDD 33 do not coincide with each other, that is, when the historical data stored in one of the processing management section 19b and the HDD 33 is unauthorizedly edited or erased, the control section 10 can notify this to the user by displaying it on the operation panel 18.

Moreover, in the image processing apparatus 1, the start and end of the historical data management processing to store the historical data in the processing management section 19b and/or the HDD 33 of the server apparatus 3 as described above and the confirmation and erasure of the historical data stored in the processing management section 19b and the server apparatus 3 are permitted only when authentication by the administrator of the image processing apparatus 1 and the server apparatus 3 is performed and the user is authenticated as authorized.

The start and end of the historical data management processing in the processing management section 19b and/or the server apparatus 3 and the confirmation and erasure of the historical data stored in each of the processing management section 19b and the server apparatus 3 can be performed by an operation of the operation panel 18 of the image processing apparatus 1 and an operation of the operation section 34 of the server apparatus 3. In the description given below, a case where the start and end of the historical data management processing in the processing management section 19b and/or the server apparatus 3 and the confirmation and erasure of the historical data stored in each of the processing management section 19b and the server apparatus 3 are performed by operating the operation panel 18 of the image processing apparatus 1 will be shown as an example.

The processing will be described that is performed by the control section 10 when the administrator of the image processing apparatus 1 performs an operation to provide an instruction to start or end the historical data management processing in the processing management section 19b and/or the server apparatus 3 or to provide an instruction to confirm or erase the historical data managed by the processing management section 19b or the server apparatus 3. When the administrator operates a predetermined operation button of the operation panel 18 in order to perform an operation that only the administrator is permitted to perform, the control section 10 of the image processing apparatus 1 displays an administrator authentication screen as shown in FIG. 11A on the operation panel 18. The various pieces of screen information displayed on the operation panel 18 are prestored in the ROM 11.

According to the administrator authentication screen shown in FIG. 11A, the administrator inputs the authentication data assigned to the administrator with the numeric keypad of the operation panel 18 and operates the "Authenticate" button. When the "Authenticate" button is operated, the control section 10 determines whether the authentication information for administrator authentication stored in the management section 21 coincides with the inputted authentication data or not, and when it does not coincide, it is indicated that the user is not authenticated as the administrator on the operation panel 18 to notify it to the user.

On the other hand, when the user is authenticated as the administrator, the control section 10 displays an administrator operation screen as shown in FIG. 11B on the operation panel 18. The administrator operation screen is a screen for selecting among the operations of "Start historical data management processing," "End historical data management processing," "Confirm historical data" and "Erase historical data" that only the administrator is permitted to perform, and the administrator selects a desired operation.

When the administrator selects "Start historical data management processing," the control section 10 displays a management condition setting screen as shown in FIG. 11C on the operation panel 18. The management condition setting screen is a screen for setting whether to perform the processing to store the corresponding historical data in the processing management section 19b, to perform the processing to transmit the corresponding historical data to the server apparatus 3 or to perform both of these processings when an instruction to execute various processings is accepted. The administrator selects one of "In this machine," "Server" and "Both" as the management place of the historical data, selects the kind of processing for which the historical data is to be managed from among "Copy," "Fax" and "Printer," and operates the "Set" button.

On the management condition setting screen, not only one of "Copy," "Fax" and "Printer" but also two or all of them can be selected, and whether to perform the management of the historical data or not can be set for each processing. Moreover, a structure may be adopted such that on the management condition setting screen, whether to perform the processing to store the historical data in the processing management section 19b of the HDD 19, perform the processing to transmit the historical data to the server apparatus 3 or perform both of these processings can be set according to the kind of image processing.

When the administrator operates the "Set" button on the management condition setting screen shown in FIG. 1C, the control section (setting means) 10 sets the selected processing as the object of the historical data management processing in the selected management place. By doing this, when an instruction to execute the set processing is accepted, the control section 10 performs the processing to store, in the processing management section 19b, the image data read from the original as the object of processing or the image data externally received as the object of processing, and the processing information related to the processing represented by the accepted execution instruction as historical data, and/or the processing to transmit the historical data to the server apparatus 3.

Specifically, when an instruction to execute the copying processing (copy) or the facsimile transmission processing is accepted from the user, the control section 10 of the image processing apparatus 1 temporarily stores the image data read from the original by the image reading section 15 and encrypted by the data processing section 23, in the image storage section 19a of the HDD 19, and then, stores (copies) in the processing management section 19b and/or transmits to the server apparatus 3 the image data together with various processing conditions in the copying processing or the facsimile transmission processing and the date and time information indicated by the timer of the control section 10 as historical data. Then, when the storage of the historical data into the processing management section 19b and/or the transmission of the historical data to the server apparatus 3 is completed, the control section 10 transfers the image data stored in the image storage section 19a to the image forming section 17 or to the modem 14 according to the accepted execution instruction, and executes the processing of image forming on a sheet or the facsimile transmission processing.

Moreover, when the image processing apparatus 1 performs the facsimile reception processing or the image formation processing based on the data received from the external computers 2, the control section 10 temporarily stores the image data received through the NCU 13 and the modem 14 or through the communication section 20 and encrypted by the data processing section 23, in the image storage section 19a of the HDD 19. Then, the control section 10 stores in the processing management section 19b and/or transmits to the server apparatus 3 the image data together with various processing conditions in the facsimile reception processing or the processing of data reception from the computer 2 and the date and time information indicated by the timer of the control section 10 as historical data. Then, when the storage of the historical data into the processing management section 19b and/or the transmission of the historical data to the server apparatus 3 is completed, the control section 10 transfers the image data stored in the image storage section 19a to the image forming section 17 according to the accepted execution instruction, and executes the processing of image forming on a sheet.

As described above, by storing the image data subjected to the processing in the processing management section 19b and/or the server apparatus 3 when the image processing apparatus 1 performs various image processings, the historical data in the image processing performed by the image processing apparatus 1 can be managed in the image processing apparatus 1 and/or in the server apparatus 3. Moreover, by storing the processing information related to each processing as historical data together with the image data subjected to the processing, which image data was used, when the image data was used and for which processing the image data was used can be grasped. Further, by storing the historical data in the processing management section 19b and/or the server apparatus 3 before the image processing is performed, the image data fetched in the image processing apparatus 1 to execute the image processing can be reliably managed as historical data.

On the other hand, when the administrator selects "End historical data management processing" on the administrator operation screen shown in FIG. 11B, the control section 10 ends the processing to store the historical data in the processing management section 19b of the HDD 19 and/or the server apparatus 3 when the image processing apparatus 1 accepts the execution instruction of various processings as described above. Also when the historical data management processing is ended, since the control section 10 performs the administrator authentication as shown in FIG. 11A and can end the historical data management processing only when the user is authenticated as an authorized administrator, it never occurs that security is inadvertently reduced by an unauthorized person ending the historical data management processing.

Figure 12A:
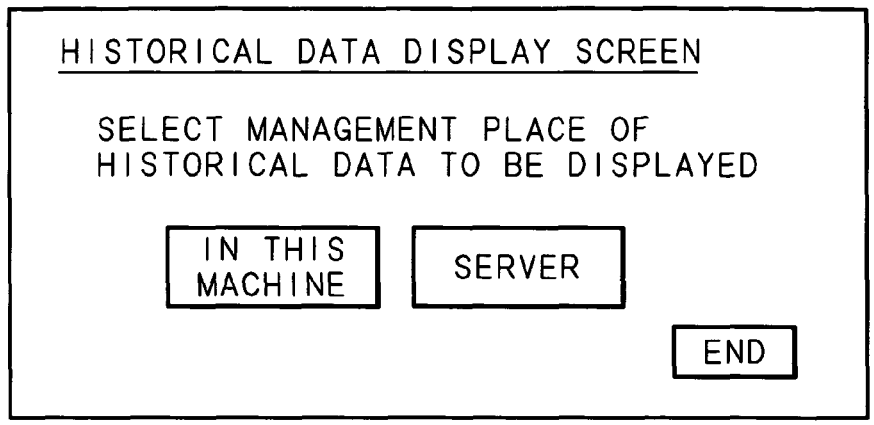
FIGS. 12A to 12C are schematic views showing an example of the arrangement of a historical data display screen.

Moreover, when the administrator selects "Confirm historical data" on the management operation screen shown in FIG. 11B, the control section 30 displays a historical data display screen as shown in FIG. 12A on the operation panel 18. The historical data display screen shown in FIG. 12A is a screen for selecting the historical data stored in the processing management section 19b of the image processing apparatus 1 or the historical data stored in the HDD 33 of the server apparatus 3 as the historical data to be displayed on the operation panel 18, and prompts the administrator to select the management place of the historical data to be displayed.

Figure 12B:
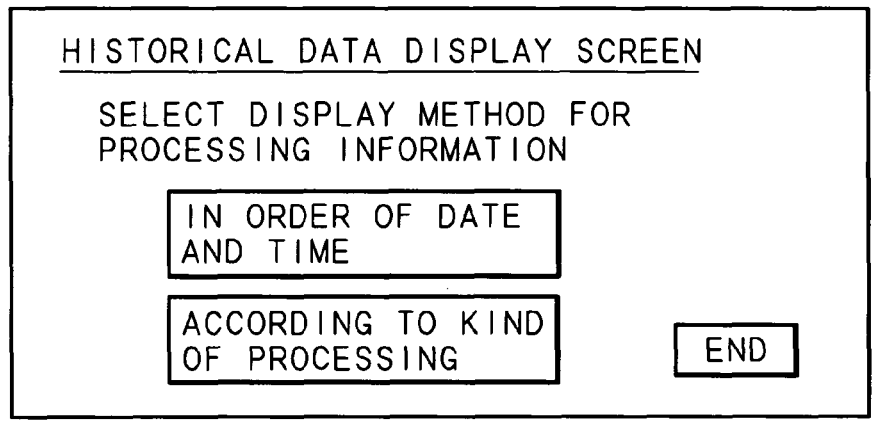

When the administrator selects the management place of the historical data to be displayed, the control section 10 displays a historical data display screen as shown in FIG. 12B on the operation panel 18. In the present embodiment, in selecting the historical data to be displayed, the processing information of the processing represented by each piece of historical data is used, and the historical data display screen shown in FIG. 12B is a screen for selecting whether to display the processing information of the historical data stored in the selected management place through the screen of FIG. 12A in the order of date and time or in the order of date and time according to the kind of processing.

Figure 12C:
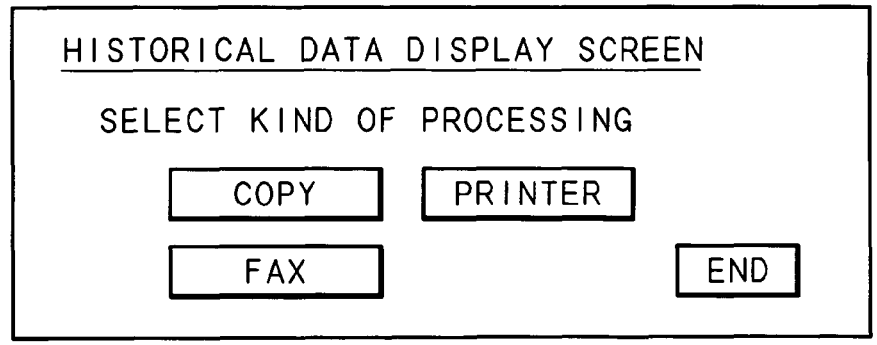

When the administrator selects "In order of date and time" on the historical data display screen, the control section 10 lists the processing information corresponding to each of all the pieces of historical data stored in the selected management place (the processing management section 19b of the HDD 19 or the HDD 33 of the server apparatus 3) in the order of date and time on the operation panel 18. Moreover, when the administrator selects "According to kind of processing," the control section 10 displays the historical data display screen shown in FIG. 12C on the operation panel 18, and prompts the administrator to select the kind of processing whose processing information is to be displayed.

When the administrator selects the kind of processing whose processing information is to be displayed, the control section 10 reads out the processing information corresponding to the selected kind of processing from the selected management place (the processing management section 19b of the HDD 19 or the HDD 33 of the server apparatus 3) and displays it in the order of date and time on the operation panel 18. For example, when the administrator selects "Fax," the control section 10 reads out the processing information representative of the historical data in the facsimile transmission processing and the facsimile reception processing from the processing management section 19b or the HDD 33 and displays it as shown in FIG. 13A. When the HDD 33 is selected as the management place of the historical data to be displayed, the processing information list as shown in FIG. 13A can be displayed by the control section 10 requesting the processing information representative of the historical data stored in the HDD 33 from the server apparatus 3.

The administrator identifies, from the processing information list, the processing information representative of the historical data to be displayed for confirmation on the operation panel 18, selects the identified processing information, and operates an OK button. When the administrator operates the OK button, the control section 10 reads out the historical data corresponding to the selected processing information from the processing management section 19b or the HDD 33, decrypts the image data (encrypted data) in the historical data by the data processing section 23, and displays it on the display section 18 as shown in FIG. 13B.

Also in this example, the selected historical data can be displayed on the operation panel 18 by the control section 10 requesting the historical data stored in the HDD 33 from the server apparatus 3. As described above, even when the historical data stored in the processing management section 19b or the HDD 33 is displayed, by performing administrator authentication according to the administrator authentication screen shown in FIG. 11A, the readout of the historical data by unauthorized persons can be inhibited.

On the historical data display screen shown in FIG. 13B, the processing information and the image data in the historical data being read out, and a "Print" button for the image output of the displayed historical data onto a sheet are displayed. The administrator operates the "Print" button when intending to perform the image output of the displayed historical data. When the "Print" button is operated, the control section 10 transfers the historical data obtained from the processing management section 19b or the HDD 33 to the image forming section 17.

On the other hand, when the administrator selects "Erase historical data" on the administrator operation screen shown in FIG. 11B, the control section 10 displays a historical data erasure screen as shown in FIG. 14A on the operation panel 18. The historical data erasure screen shown in FIG. 14A is a screen for selecting the historical data stored in the processing management section 19b of the image processing apparatus 1 or the historical data stored in the HDD 33 of the server apparatus 3 as the historical data to be erased, and prompts the administrator to select the management place of the historical data to be erased.

When the administrator selects the management place of the historical data to be erased, the control section 10 displays a historical data erasure screen as shown in FIG. 14B on the operation panel 18. The historical data erasure screen is a screen for selecting the erasing method from among "Erase all historical data," "Erase according to kind of processing" and "Erase according to date and time" with respect to the historical data stored in the management place selected through the screen of FIG. 14A.

Figure 15A:
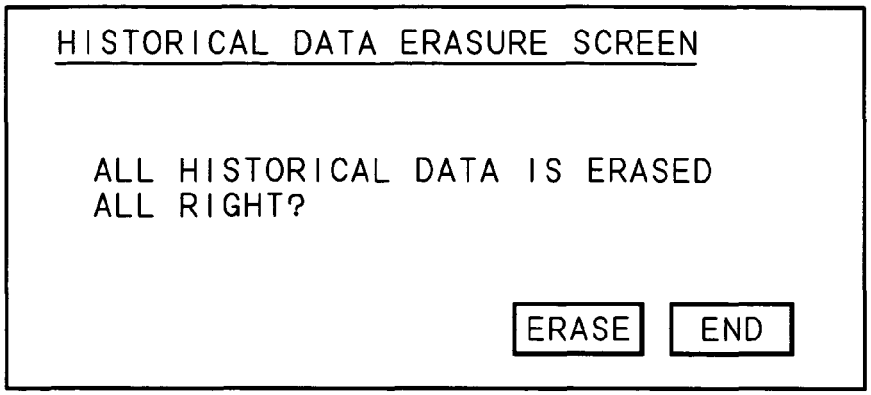
FIGS. 15A to 15C are schematic views showing an example of the arrangement of the historical data erasure screen.

When the administrator selects "Erase all historical data," the control section 10 displays a confirmation screen as shown in FIG. 15A on the operation panel 18, and when an "Erase" button is operated by the administrator, all the historical data stored in the selected management place (the processing management section 19b of the HDD 19 or the HDD 33 of the server apparatus 3) is erased by the data invalidating section 22 or the data invalidating section 38 of the server apparatus 3. The historical data stored in the HDD 33 is erased by the data invalidating section 38 controlled by the control section 30 of the server apparatus 3 by the control section 10 of the image processing apparatus 1 instructing the control section 30 to erase the data. The historical data stored in the processing management section 19b or the HDD 33 may be invalidated by being overwritten with predetermined data as well as erased by the data invalidating sections 22 and 38.

Figure 15B:
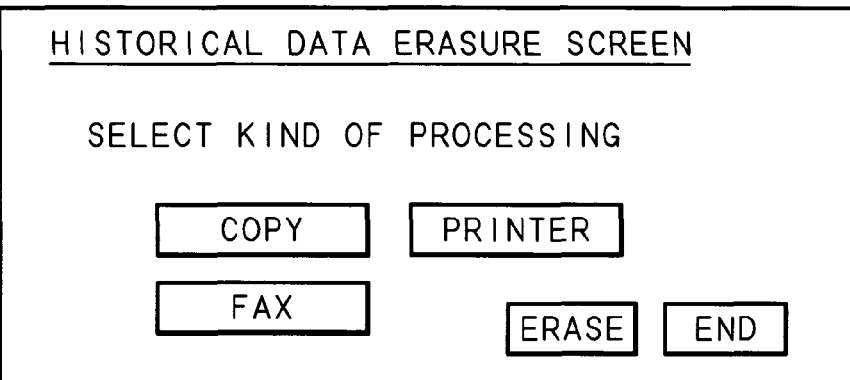

Moreover, when the administrator selects "Erase according to kind of processing," the control section 10 displays, on the operation panel 18, a screen for selecting the kind of processing whose historical data is to be erased from the processing management section 19b or the HDD 33 as shown in FIG. 15B. When the administrator selects the kind of processing whose historical data is to be erased and operates the "Erase" button on the historical data erasure screen shown in FIG. 15B, the control section 10 erases the piece of historical data, corresponding to the selected processing, of the historical data stored in the processing management section 19b or the HDD 33 by the data invalidating section 22 or 38.

Figure 15C:
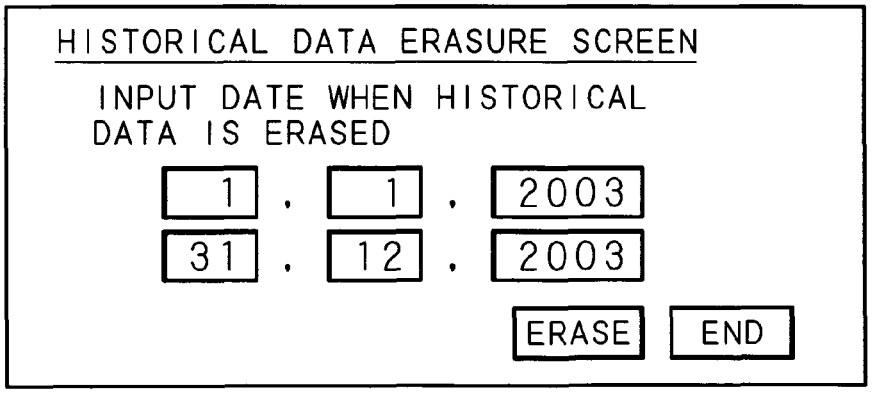

Further, when the administrator selects "Erase according to date and time," the control section 10 displays, on the operation panel 18, a screen for inputting the date and time in the historical data to be erased from the processing management section 19b or the HDD 33 as shown in FIG. 15C. When the administrator inputs a desired date and time with the numeric keypad and operates the "Erase" button on the historical data erasure screen shown in FIG. 15C, the control section 10 erases the corresponding piece of historical data, within the range of the inputted date and time, of the historical data stored in the processing management section 19b or the HDD 33 by the data invalidating section 22 or 38.

As described above, also when the historical data stored in the processing management section 19b or the HDD 33 is erased, by permitting only the administrator authorized as an authorized administrator in the administrator authentication performed according to the administrator authentication screen shown in FIG. 11A to erase the historical data, the erasure of the historical data by unauthorized persons can be inhibited, the historical data of the image processing performed by the image processing apparatus 1 can be reliably managed in the image processing apparatus 1 and/or the server apparatus 3, and the unnecessary historical data can be erased by the administrator, so that the processing management section 19b and the HDD 33 can be effectively used.

Further, when the user information is included in the processing information in the historical data stored in the processing management section 19b or the HDD 33, as described above, the historical data can be erased not only according to the kind of processing or the date and time but also according to the user, so that the historical data related to the processing performed by a user who no longer uses the image processing apparatus 1 because of, for example, retirement can be selected and erased.

Figure 16:
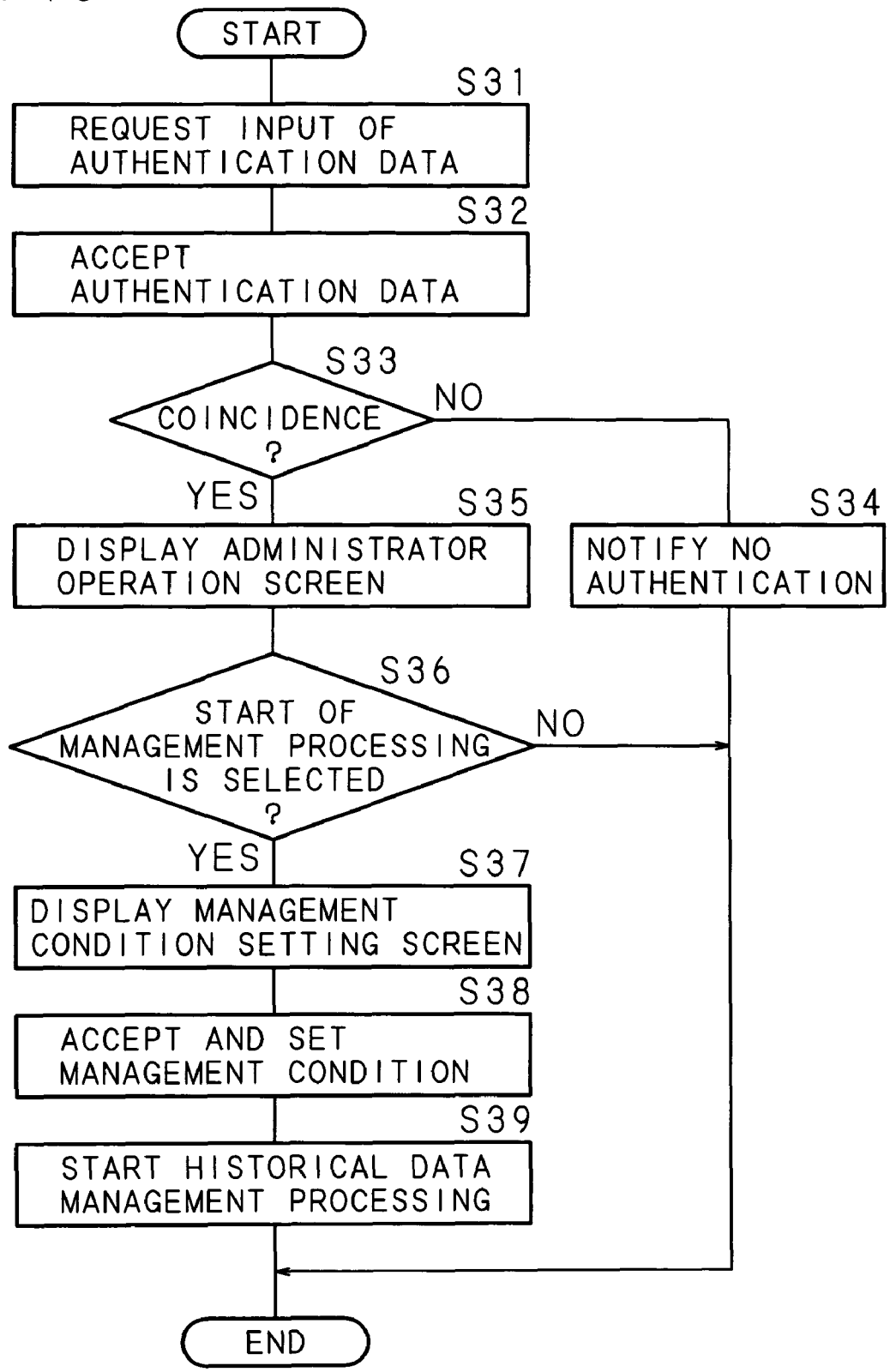
FIG. 16 is a flowchart showing the procedure in the setting of a historical data management processing.

The operation will be described that is performed by the image processing apparatus 1 when the administrator sets the start of the historical data management processing as described above. FIG. 16 is a flowchart showing the procedure of the setting of the historical data management processing by the image processing apparatus 1 according to the third embodiment. The procedure described below is executed by the control section 10 according to a program stored in the ROM 11.

In the image processing apparatus 1 in normal operation, when the administrator operates a predetermined operation button of the operation panel 18 in order to perform an operation to set the start of the historical data management processing, the control section 10 displays the administrator authentication screen shown in FIG. 11A and requests the input of the authentication data (S31). The administrator inputs the authentication data with the numeric keypad of the operation panel 18 according to the administrator authentication screen, and operates the "Authenticate" button. By doing this, the control section 10 accepts the inputted authentication data (S32), and determines whether the administrator is an authorized administrator or not based on whether or not the accepted authentication data coincides with the authentication information for administrator authentication prestored in the management section 21 (S33).

When determining that the administrator is not an authorized administrator (NO at S33), the control section 10 indicates that the administrator is not authenticated as authorized on the operation panel 18 to notify it to the user (S34). When determining that the administrator is an authorized administrator (YES at S33), the control section 10 displays the administrator operation screen shown in FIG. 11B (S35), and accepts the selection of the processing that the administrator intends to perform.

The control section 10 determines whether the administrator selects "Start historical data management processing" on the administrator operation screen or not (S36), and when determining that "Start historical data management processing" is not selected (NO at S36), the control section 10 executes the operation selected by the administrator as described with reference to FIGS. 12 to 15.

On the other hand, when determining that "Start historical data management processing" is selected (YES at S36), the control section 10 displays the management condition setting screen shown in FIG. 11C (S37). The administrator selects the management place of the historical data and the kind of processing whose historical data is managed according to the management condition setting screen, and operates the "Set" button. By doing this, the control section 10 accepts the selected management condition, makes a setting so that the historical data is managed in the selected management place with respect to the processing represented by the accepted management condition (S38), and starts the historical data management processing according to the set condition (S39).

Figure 17A:
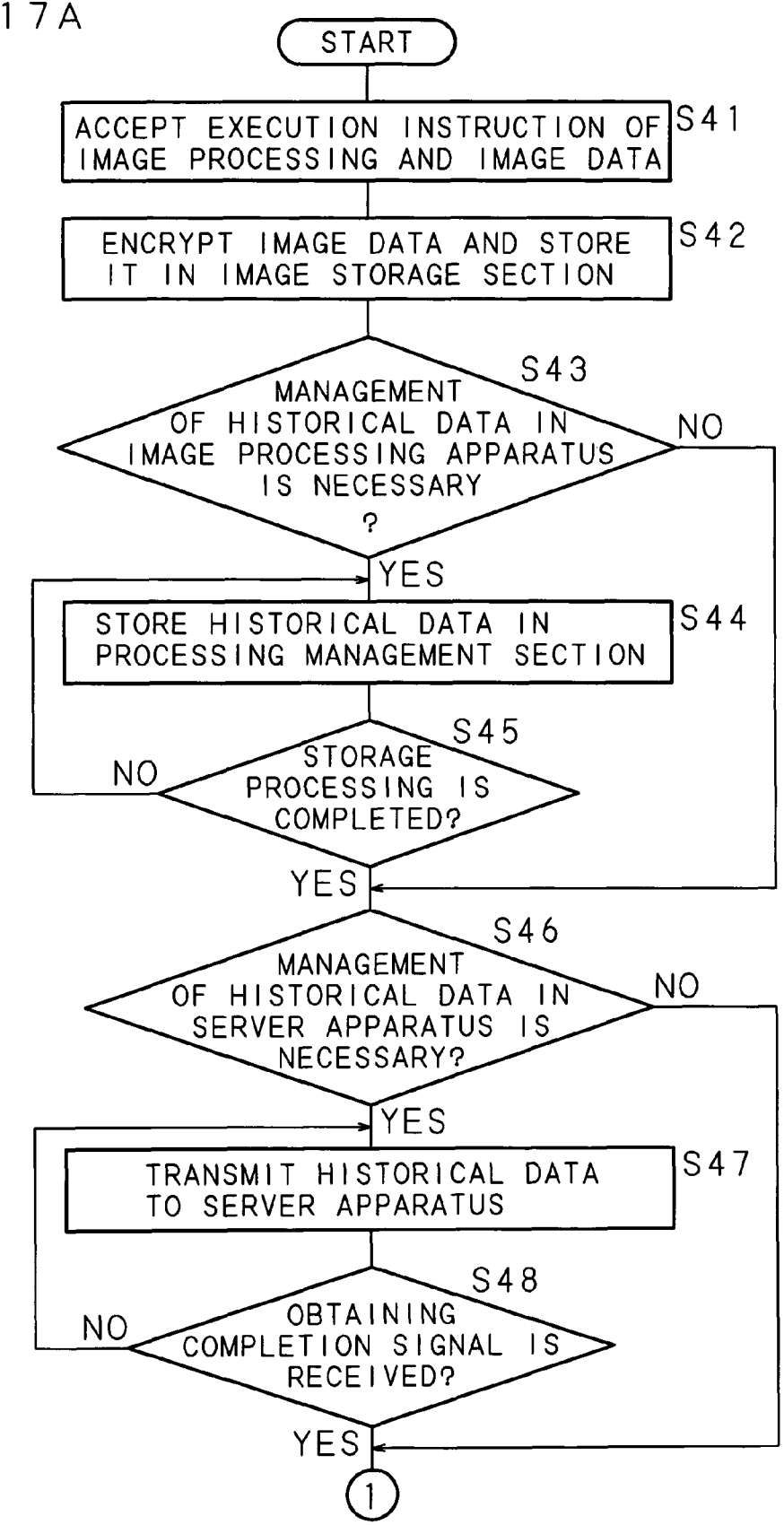
FIGS. 17A and 17B are flowcharts showing the procedure of the historical data management processing.
Figure 17B:
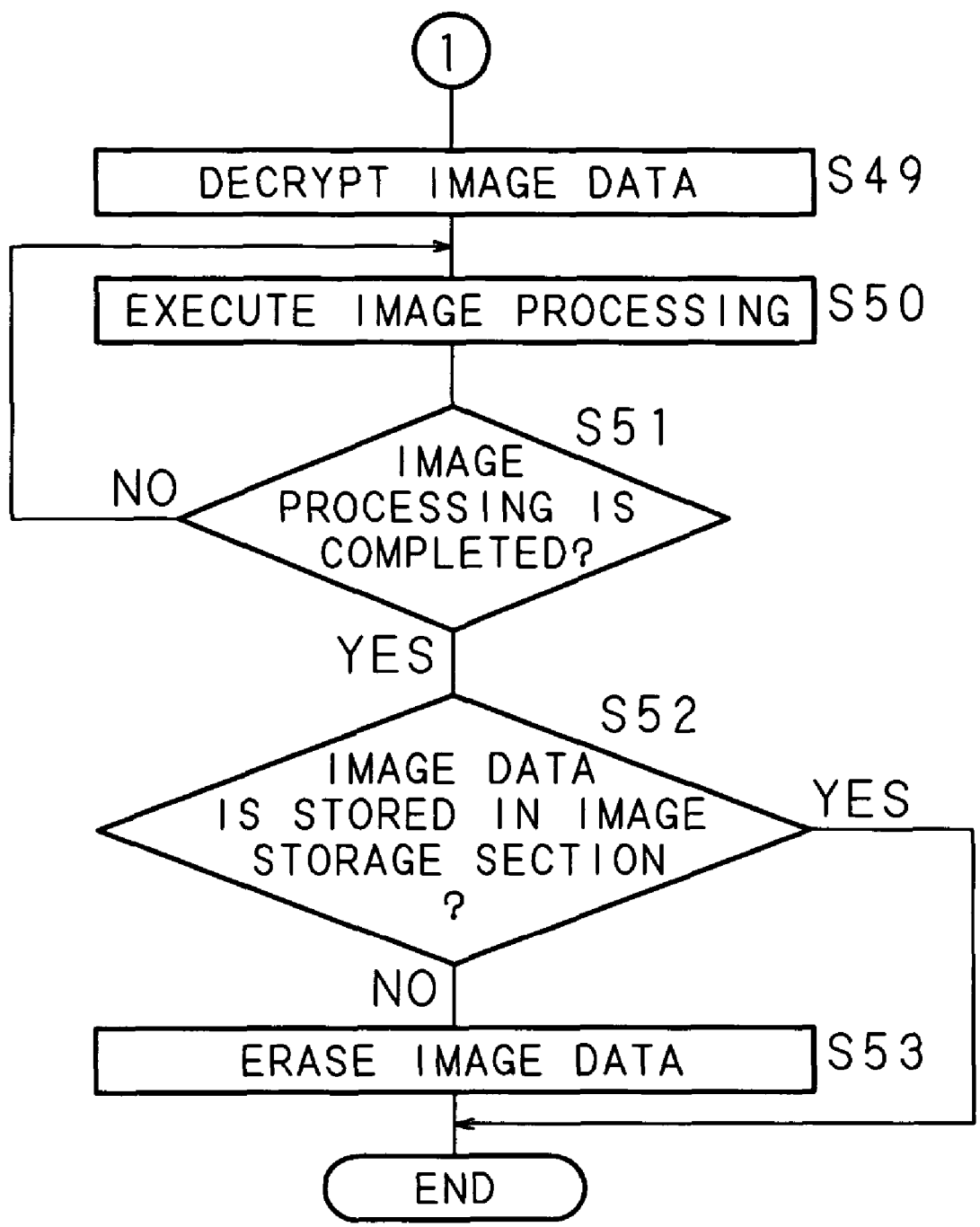

The operation will be described that is performed by the image processing apparatus 1 when the condition for the historical data management processing is set by the administrator and an instruction to start the management processing is provided as described above. FIGS. 17A and 17B are flowcharts showing the procedure of the historical data management processing by the image processing apparatus 1 according to the third embodiment. The procedure described below is executed by the control section 10 according to a program stored in the ROM 11.

In the image processing apparatus 1 in normal operation, when an instruction to execute the copying processing or the facsimile transmission processing is accepted by an operation of the operation panel 18 by the user, when the NCU 13 and the modem 14 receive facsimile data or when the communication section 20 receives a print job, the control section 10 accepts the image data subjected to the processing together with the instruction to execute various image processings (S41). The control section 10 encrypts, by the data processing section 23, the accepted image data, specifically, the image data read from the original by the image reading section 15, the image data obtained by developing the facsimile data received through the modem 14 or the image data obtained by developing the print job received through the communication section 20, and temporarily stores it in the image storage section 19a of the HDD 19 (S42).

The control section 10 determines whether or not it is necessary to manage the historical data related to the image data stored in the image storage section 19a at step S42 in the image processing apparatus 1 (the machine) based on whether or not a setting is made so as to perform the historical data management processing in the image processing apparatus 1 for the image processing the execution instruction of which is accepted at step S41 (S43). When determining that the management of the historical data is necessary (YES at S43), the control section 10 stores, in the processing management section 19b, the image data stored in the image storage section 19a and the processing information related to the image processing the execution instruction of which is accepted at step S41 as historical data (S44). When determining that the management of the historical data is unnecessary (NO at S43), the control section 10 shifts the procedure to step S46.

The control section 10 determines whether the processing to store the historical data into the processing management section 19b is completed or not (S45). When determining that the storage processing is not completed (NO at S45), the control section 10 continues the processing to store the historical data into the processing management section 19b until the storage processing is completed (S44). When determining that the storage processing is completed (YES at S45), the control section 10 determines whether or not it is necessary to manage the historical data related to the image data stored in the image storage section 19a at step S42 in the server apparatus 3 based on whether or not a setting is made so as to perform the historical data management processing in the server apparatus 3 on the image processing the execution instruction of which is accepted at step S41 (S46).

When determining that the management of the historical data in the server apparatus 3 is necessary (YES at S46), the control section 10 transmits the image data stored in the image storage section 19a and the processing information related to the image processing the execution instruction of which is accepted at step S41 from the communication section 20 to the server apparatus 3 as historical data (S47). When determining that the management of the historical data in the server apparatus 3 is unnecessary (NO at S46), the control section 10 shifts the procedure to step S49. Moreover, when the historical data is stored in the processing management section 19b at step S44, this historical data is transmitted to the server apparatus 3 at step S47.

The control section 10 determines whether or not the obtaining completion signal representative of the completion of obtaining of the historical data is received from the server apparatus 3 transmitting the historical data (S48). When determining that the obtaining completion signal is not received (NO at S48), the control section 10 continues the transmission of the historical data to the server apparatus 3 until the obtaining completion signal is received (S47). When determining that the obtaining completion signal is received (YES at S48), the control section 10 reads out the image data stored in the image storage section 19a at step S42 and decrypts it by the data processing section 23 (S49), and executes the image processing according to the execution instruction accepted at step S41 (S50).

Specifically, when an instruction to execute the processing of image output onto a sheet is provided, the image data stored in the image storage section 19a is transferred to the image forming section 17, when an instruction to execute the facsimile transmission processing is provided, the image data stored in the image storage section 19a is transferred to the modem 14, and when an instruction to execute the network transmission processing is provided, the image data stored in the image storage section 19a is transferred to the communication section 20.

The control section 10 determines whether the executed image processing is completed or not (S51). When determining that the image processing is not completed (NO at S51), the control section 10 continues the image processing until the completion (S50), and when determining that the image processing is completed (YES at S51), the control section 10 determines whether to store the image data subjected to the executed image processing in the image storage section 19a of the HDD 19 or not based on the setting from the user or the administrator (S52). When determining that the image data is stored in the image storage section 19a (YES at S52), the control section 10 ends the processing without performing any operation, and when determining that the image data is not stored in the image storage section 19a (NO at S52), the control section 10 erases the image data stored in the image storage section 19a at step S42 by the data invalidating section 22 (S53), and ends the procedure.

As described above, when the image processing apparatus 1 accepts an instruction to execute the copying processing, the facsimile communication processing or the network communication processing, by storing the image data subjected to the processing together with the processing information related to each processing as historical data in the image processing apparatus 1 and/or the server apparatus 3, with respect to each pieces of image data, when it was used and for which processing it was used can be grasped together with the contents of the image data, subjected to the processing, itself. Moreover, in the case of a structure where user authentication is mandatory when each user uses the image processing apparatus 1, since the user information as well as the processing information can be managed for each piece of processed image data, unauthorized use of the image data can be prevented. Moreover, with respect to unauthorizedly used image data, when it was used, who used it and for which processing it was used can be identified.

The comparison processing will be described that is performed by the image processing apparatus 1 according to the third embodiment when the historical data is stored in both of the processing management section 19b of the HDD 19 and the HDD 33 of the server apparatus 3. FIG. 18 is a flowchart showing the procedure of the historical data comparison processing by the image processing apparatus 1 according to the third embodiment. The procedure described below is executed by the control section 10 according to a program stored in the ROM 11.

The control section 10 of the image processing apparatus 1 performs a determination as to whether a predetermined time has elapsed or not according to the time indicated by its own timer in addition to various processings such as the execution of the image processing as described above and the storage of the historical data into the processing management section 19b and/or the server apparatus 3 (S61). When determining that the predetermined time has not elapsed (NO at S61), the control section 10 waits until the elapse of the predetermined time while performing a processing other than the historical data comparison processing.

When determining that the predetermined time has elapsed (YES at S61), the control section 10 requests the processing information representative of each piece of historical data stored in the HDD 33 of the server apparatus 3 to the server apparatus 3 (S62), and the control section 30 of the server apparatus 3 transmits, to the image processing apparatus 1, the processing information corresponding to each piece of historical data stored in the HDD 33 up to this point of time (S63). The control section 10 of the image processing apparatus 1 compares the processing information received from the server apparatus 3 with the processing information corresponding to each piece of historical data stored in the processing management section 19b of the HDD 19 (S64), and determines whether they coincide with each other or not (S65).

When determining that they coincide with each other (YES at S65), the control section 10 shifts the procedure to step S61, and waits until the next elapse of the predetermined time. When determining that they do not coincide with each other (NO at S65), the control section 10 indicates, as a warning, that the historical data managed in the image processing apparatus 1 and the historical data managed in the server apparatus 3 do not coincide with each other (S66), shifts the procedure to step S61, and waits until the next elapse of the predetermined time.

As described above, by the control section 10 of the image processing apparatus 1 periodically comparing the historical data stored in the processing management section 19b of the HDD 19 with the historical data stored in the HDD 33 of the server apparatus 3 based on the processing information included in each piece of historical data, that the historical data stored in the processing management section 19b or the HDD 33 is unauthorizedly edited or erased for some reason can be detected at an early stage.

Moreover, this comparison processing may be performed by the control section 30 of the server apparatus 3. In this case, by the control section 30 periodically obtaining the processing information corresponding to the historical data stored in the image processing apparatus 1, the processing information corresponding to the historical data stored in the HDD 33 of the control section 30 and the processing information corresponding to the historical data stored in the image processing apparatus 1 can be compared with each other. Further, a structure may be adopted such that when the image processing apparatus 1 transmits the historical data to the server apparatus 3, the above-described comparison processing is performed and only when the pieces of processing information coincide with each other as the result of the comparison, the historical data is transmitted from the image processing apparatus 1 to the server apparatus 3.

Moreover, while in the above-described embodiments, a structure is described such that the image processing apparatus 1 transmits the historical data to the server apparatus 3 as required when performing the copying processing, the facsimile processing and the network communication processing, a structure may be adopted such that the historical data is temporarily stored in the processing management section 19b, periodically transmitted to the server apparatus 3 and managed in the server apparatus 3. In this case, the load on the communication network 100 imposed by the processing of historical data transfer from the image processing apparatus 1 to the server apparatus 3 can be reduced.

Further, while a structure such that the processing of comparison between the historical data stored in the image processing apparatus 1 and the historical data stored in the server apparatus 3 is performed based on the processing information included in each piece of historical data is shown as an example, the comparison may be performed with respect to the entire historical data. In this case, falsification in the image data in the historical data stored in each of the image processing apparatus 1 and the server apparatus 3 can be detected. Moreover, as a method of warning when the historical data stored in the image processing apparatus 1 and the historical data stored in the server apparatus 3 do not coincide with each other, a warning output section that outputs a warning sound or voice or a warning indicator output section such as an LED or a rotating light may be used as well as displaying a warning message on the operation panel 18.

While in the above-described third embodiment, a structure is described such that the encryption processing is performed on the image data read from the original by the image reading section 15, the image data received from the external facsimile apparatus 4 and the image data obtained by developing a print job received from the external computers 2 and the encrypted image data is stored in the image storage section 19a of the HDD 19, a structure may be adopted such that the historical data is encrypted when transmitted from the image processing apparatus 1 to the server apparatus 3. Moreover, when a structure is adopted such that the encryption key is not transmitted to the server apparatus 3 and only the encrypted historical data is transmitted, even when the historical data leaks from the server apparatus 3, it is difficult to unauthorizedly use the historical data, so that the security of the image processing apparatus 1 can be improved.

While in the image processing apparatuses 1 of the above-described embodiments, a structure is described such that the image data is obtained by the original image reading processing by the image reading section 15 and the image data reception processing through the modem 14 or the communication section 20, when the image processing apparatus 1 is provided with a mechanism to read a card-form recording medium such as an IC card and a memory card, a structure may be adopted such that the image data read out from the card-form recording medium is obtained.

While in the above-described embodiments, the authentication data when administrator authentication or user authentication is performed is inputted by an operation of the operation panel 18, a structure may be adopted such that a reader capable of reading, for example, an RFID (radio frequency identification) card in a noncontact manner is provided and the authentication data recorded on the RFID card is read by the reader.

Further, while in the above-described embodiments, a structure is described such that the image data, subjected to the copying processing, the facsimile processing or the network communication processing, itself is stored in the processing management section 19b of the HDD 19 as historical data, a structure may be adopted such that when predetermined information is included in the image data read from the original and the externally received image data, the corresponding historical data is stored in the processing management section 19b. In this case, it can be performed to select only the image data read from an original with a mark representing that this is an important document such as "FOR INTERNAL USE ONLY" and store it in the processing management section 19b.

Moreover, a structure may be adopted such that the operation panel 18 is provided with an all clear button or a clear button and even when the data obtaining is interrupted such as when the all clear button or the clear button is operated during the original reading processing by the image reading section 15 or when the all clear button or the clear button is operated during the image data reception from outside, the image data obtained up to the interruption is stored in the processing management section 19b together with the condition of the interruption of the reading processing as historical data. In this case, even when the image processing is not completed, all the data for which the image processing is to be executed in the image processing apparatus 1 can be managed as historical data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, ore equivalence of such metes and bounds thereof are therefore intended to be embraced by the claims.

The invention claimed is:

1. An image processing apparatus comprising:
a data storing unit that stores accepted data;
an instruction accepting unit that accepts an instruction to execute an image processing based on the accepted data;
a plurality of processing units that perform a plurality of kinds of image processing, respectively, based on the data stored in the data storing unit according to the execution instruction accepted by the instruction accepting unit;
a setting accepting unit that accepts via an operation panel, for each image processing performed by each of the processing units, an instruction as to whether the data stored in the data storing unit and information related to the image processing based on the data of the execution instruction of which is accepted by the instruction accepting unit are to be outputted or not to a predetermined external apparatus as historical information;
a setting unit that sets whether or not to output the historical information related to each image processing to the external apparatus according to the accepted instruction;
an output unit that outputs the historical information to the predetermined external apparatus when the setting to output is accepted by the setting unit;
a determining unit that determines whether or not predetermined information is included in the data stored in the data storing unit,
wherein the output unit outputs, to the external apparatus, the historical information related to the data determined to include the predetermined information;
a storage interrupting unit that interrupts storage of the accepted data into the data storing unit,
wherein the output unit outputs, to the external apparatus, the historical information related to the data stored in the data storing unit before the data storage into the data storing unit is interrupted;

an obtaining unit that obtains a signal representative of completion of obtaining of the historical information from the external apparatus; and an erasing unit that erases the data related to the historical information from the data storing unit when the obtaining unit obtains the signal.

2. The image processing apparatus according to claim 1, wherein the processing unit starts the image processing related to the historical information when the obtaining unit obtains the signal, and the erasing unit erases the data related to the historical information when the processing unit ends the image processing.

3. The image processing apparatus according to claim 1, further comprising an authenticating unit, wherein when the authenticating unit authenticates as authorized, the processing unit performs the image processing based on the data stored in the data storing unit according to the execution instruction accepted by the instruction accepting unit, and the historical information includes information related to authentication performed when the processing unit performs the image processing based on the data.

4. The image processing apparatus according to claim 1, further comprising:

a stop authenticating unit that performs authentication in order to stop the processing to output the historical information to the external apparatus; and an output stopping unit that stops the processing to output the historical information when the stop authenticating unit authenticates as authorized.

5. The image processing apparatus according to claim 1, further comprising a key storing unit that stores an encryption key; and an encrypting unit that encrypts the historical information by use of the encryption key stored in the key storing unit, wherein the output unit outputs encrypted historical information to the external apparatus, and the following are further provided: an obtaining unit that obtains the encrypted historical information from the external apparatus; and an decrypting unit that decrypts the obtained historical information by use of the encryption key stored in the key storing unit.

6. An image processing apparatus comprising:

a data storing unit that stores accepted data;

an instruction accepting unit that accepts an instruction to execute an image processing based on the accepted data;

a plurality of processing units that perform a plurality of kinds of image processing, respectively, based on the data stored in the data storing unit according to the execution instruction accepted by the instruction accepting unit;

a storing accepting unit that accepts via an operation panel, for the image processing performed by each of the processing units, an instruction as to whether the data stored in the data storing unit and information related to the image processing based on the data of the execution instruction of which is accepted by the instruction accepting unit are to be stored or not as historical information;

a setting unit that sets whether or not to store the historical information related to each image processing according to the accepted instruction;

a history storing unit that stores the historical information when the setting to store is accepted by the setting unit;

an output unit that outputs the historical information stored in the history storing unit to a predetermined external apparatus;

a determining unit that determines whether or not predetermined information is included in the data stored in the data storing unit, wherein the output unit outputs, to the external apparatus, the historical information related to the data determined to include the predetermined information;

a storage interrupting unit that interrupts storage of the accepted data into the data storing unit, wherein the output unit outputs, to the external apparatus, the historical information related to the data stored in the data storing unit before the data storage into the data storing unit is interrupted;

an obtaining unit that obtains a signal representative of completion of obtaining of the historical information from the external apparatus; and an erasing unit that erases the historical information from the history storing unit when the obtaining unit obtains the signal.

7. The image processing apparatus according to claim 6, further comprising:

a key storing unit that stores an encryption key; and an encrypting unit that encrypts the historical information by use of the encryption key stored in the key storing unit, wherein the output unit outputs encrypted historical information to the external apparatus, and the following are further provided: an obtaining unit that obtains the encrypted historical information from the external apparatus; and a decrypting unit that decrypts the obtained historical information by use of the encryption key stored in the key storing unit.

8. An image processing system comprising:

the image processing apparatus according to claim 1; and an external apparatus capable of communicating with the image processing apparatus, wherein the external apparatus comprises:

an external history storing unit that stores historical information outputted from the image processing apparatus;

an output unit that outputs a signal representative of completion of obtaining of the historical information to the image processing apparatus when the historical information is stored in the external history storing unit;

an access authenticating unit that performs authentication in order to access the external history storing unit; and a permitting unit that permits the access when the access authenticating unit authenticates as authorized.

9. An image processing system comprising:

the image processing apparatus according to claim 6; and an external apparatus capable of communicating with the image processing apparatus;

wherein the external apparatus comprises:

an external history storing unit that stores historical information outputted from the image processing apparatus;

an output unit that outputs a signal representative of completion of obtaining of the historical information to the image processing apparatus when the historical information is stored in the external history storing unit;

an access authenticating unit that performs authentication in order to access the external history storing unit; and a permitting unit that permits the access when the access authenticating unit authenticates as authorized.

10. An image processing system comprising:
an image processing apparatus; and
an external apparatus capable of communicating with the image processing apparatus,
wherein the image processing apparatus comprises:
a data storing unit that stores accepted data;
an instruction accepting unit that accepts an instruction to execute an image processing based on the accepted data;
a plurality of processing units that perform a plurality of kinds of image processing, respectively, based on the data stored in the data storing unit according to the execution instruction accepted by the instruction accepting unit;
a storing accepting unit that accepts via an operation panel, for the image processing performed by each of the processing units, an instruction as to whether the data stored in the data storing unit and processing information related to the image processing based on the data of the execution instruction of which is accepted by the instruction accepting unit are to be stored or not as historical information;
a setting unit that sets whether or not to store the historical information related to each image processing according to the accepted instruction;
a history storing unit that stores the historical information when the setting to store is accepted by the setting unit;
an output unit that outputs the historical information to the external apparatus;
a determining unit that determines whether or not predetermined information is included in the data stored in the data storing unit,
wherein the output unit outputs, to the external apparatus, the historical information related to the data determined to include the predetermined information; and
a storage interrupting unit that interrupts storage of the accepted data into the data storing unit,
wherein the output unit outputs, to the external apparatus, the historical information related to the data stored in the data storing unit before the data storage into the data storing unit is interrupted;
the external apparatus comprises an external history storing unit that stores the historical information outputted from the image processing apparatus, and
the image processing apparatus comprises a control unit that performs at least one of a processing to store the historical information into the history storing unit and a processing to output the historical information to the external apparatus.

11. The image processing system according to claim 10, wherein the image processing apparatus comprises:
an accepting unit that accepts an instruction to perform one or both of the processing to store the historical information into the history storing unit and the processing to output the historical information to the external apparatus; and
a setting unit that makes a setting so that one or both of the storage processing and the output processing are performed according to the accepted instruction, and the control unit performs the processing that is set so as to be performed by the setting unit.

12. The image processing system according to claim 11, wherein the image processing apparatus comprises:
a plurality of the processing units that perform a plurality of kinds of image processings, respectively; and
an accepting unit that accepts an instruction to perform one or both of a processing to store the historical information into the history storing unit and a processing to output the historical information to the external apparatus for each image processing performed by each of the processing units, and the setting unit makes a setting so that one or both of the storage processing and the output processing are performed for each image processing according to the accepted instruction.

13. The image processing system according to claim 10, wherein at least one of the image processing apparatus and the external apparatus comprises a comparing unit that compares at least processing information included in each piece of historical information stored in the history storing unit and having been transmitted to the external apparatus with at least processing information included in each piece of historical information stored in the external history storing unit when the control unit of the image processing apparatus performs both of the processing to store the historical information into the history storing unit and the processing to output the historical information to the external apparatus, and when the comparing unit determines that the pieces of processing information coincide with each other, the output unit of the image processing apparatus outputs, to the external apparatus, the historical information stored in the history storing unit and not having been transmitted to the external apparatus.

14. The image processing system according to claim 10, wherein at least one of the image processing apparatus and the external apparatus comprises:
a comparing unit that compares at least processing information included in each piece of historical information stored in the history storing unit and having been transmitted to the external apparatus with at least processing information included in each piece of historical information stored in the external history storing unit when the control unit of the image processing apparatus performs both of the processing to store the historical information into the history storing unit and the processing to output the historical information to the external apparatus; and
a notifying unit that notifies a result of the comparison by the comparing unit to outside.

15. The image processing system according to claim 10, wherein the image processing apparatus comprises:
a key storing unit that stores an encryption key; and
an encrypting unit that encrypts at least data included in each piece of historical information by use of the encryption key stored in the key storing unit, the output unit outputs encrypted historical information to the external apparatus, and
the image processing apparatus comprises:
an obtaining unit that obtains the encrypted historical information from the external apparatus in response to a request to the external apparatus; and
a decrypting unit that decrypts the obtained historical information by use of the encryption key stored in the key storing unit.

* * * * *